US010380564B1

(12) United States Patent
Wilson et al.

(10) Patent No.: US 10,380,564 B1
(45) Date of Patent: Aug. 13, 2019

(54) MERCHANT PERFORMED BANKING-TYPE TRANSACTIONS

(71) Applicant: Square, Inc., San Francisco, CA (US)

(72) Inventors: Mathew Wilson, Sausalito, CA (US);
Daniel Phillip Neighman, Walnut Creek, CA (US)

(73) Assignee: Square, Inc., San Francisco, CA (US)

( * ) Notice: Subject to any disclaimer, the term of this patent is extended or adjusted under 35 U.S.C. 154(b) by 100 days.

(21) Appl. No.: 14/098,336

(22) Filed: Dec. 5, 2013

(51) Int. Cl.
*G06Q 20/10* (2012.01)

(52) U.S. Cl.
CPC .................. *G06Q 20/108* (2013.01)

(58) Field of Classification Search
CPC .................................................. G06Q 40/00
See application file for complete search history.

(56) References Cited

U.S. PATENT DOCUMENTS

| 4,764,666 | A | 8/1988 | Bergeron |
| 6,144,948 | A | 11/2000 | Walker et al. |
| 6,315,196 | B1 | 11/2001 | Bachman |
| 7,827,108 | B2 | 11/2010 | Perlman et al. |
| 8,041,640 | B2 | 10/2011 | Stone |
| 8,255,278 | B1 * | 8/2012 | Young ............... G06Q 20/322 705/17 |
| 9,082,119 | B2 * | 7/2015 | Ortiz ................ G06Q 20/3278 |
| 2002/0198806 | A1 | 12/2002 | Blagg et al. |
| 2005/0116028 | A1 | 6/2005 | Cohen et al. |
| 2005/0194452 | A1 | 9/2005 | Nordentoft et al. |
| 2006/0006223 | A1 | 1/2006 | Harris |
| 2006/0277271 | A1 | 12/2006 | Morse et al. |
| 2007/0131759 | A1 | 6/2007 | Cox et al. |
| 2008/0301049 | A1 * | 12/2008 | Dyson .................... A61K 31/47 705/42 |

(Continued)

FOREIGN PATENT DOCUMENTS

| WO | 01/59597 A1 | 8/2001 |
| WO | 2019005968 A1 | 1/2019 |

OTHER PUBLICATIONS

"Think you can't use that not-yet-activated credit card? Think again" 6 pages, by Melody Warnick (Year: 2009).*

(Continued)

*Primary Examiner* — Bruce I Ebersman
(74) *Attorney, Agent, or Firm* — Baker Botts L.L.P.

(57) ABSTRACT

Various embodiments are related to apparatuses and methods for enabling a merchant to perform banking-type transactions for a customer. A merchant can use, for example, a sales system configured to be used by the merchant to sell goods to perform a banking-type transaction for a customer. The sales system can send information related to the banking-type transaction to, for example, a buyer/seller platform. When the banking-type transaction is a deposit, the merchant can receive funds for the deposit from the customer. The platform can credit the customer's financial account for the deposit amount by diverting payment card funds, received by the merchant for the sale of goods and processed by the platform, to the customer's financial account. When the banking-type transaction is a withdrawal, the platform can debit the customer's financial account and credit the debited funds to the merchant's financial account.

36 Claims, 10 Drawing Sheets

(56) References Cited

U.S. PATENT DOCUMENTS

| | | | |
|---|---|---|---|
| 2009/0114716 A1* | 5/2009 | Ramachandran | G06Q 20/042 235/379 |
| 2011/0035320 A1 | 2/2011 | Perlman et al. | |
| 2011/0251892 A1* | 10/2011 | Laracey | G06Q 30/0253 705/14.51 |
| 2012/0078735 A1 | 3/2012 | Bauer et al. | |
| 2012/0233015 A1 | 9/2012 | Calman et al. | |
| 2012/0296818 A1 | 11/2012 | Nuzzi et al. | |
| 2013/0024364 A1 | 1/2013 | Shrivastava et al. | |
| 2013/0085860 A1 | 4/2013 | Summers et al. | |
| 2013/0103760 A1 | 4/2013 | Golding et al. | |
| 2013/0110658 A1 | 5/2013 | Lyman et al. | |
| 2013/0117155 A1 | 5/2013 | Glasgo | |
| 2013/0132246 A1 | 5/2013 | Amin et al. | |
| 2013/0132274 A1 | 5/2013 | Henderson et al. | |
| 2013/0132887 A1 | 5/2013 | Amin et al. | |
| 2013/0138500 A1 | 5/2013 | Charaniya et al. | |
| 2013/0138519 A1 | 5/2013 | McKenzie | |
| 2013/0144674 A1 | 6/2013 | Kim et al. | |
| 2013/0144702 A1 | 6/2013 | Tabor et al. | |
| 2013/0144783 A1* | 6/2013 | Bishop | G06Q 20/223 705/42 |
| 2013/0151419 A1 | 6/2013 | Hitchcock et al. | |
| 2013/0159086 A1 | 6/2013 | Richard | |
| 2013/0191199 A1 | 7/2013 | Corner | |
| 2013/0198075 A1 | 8/2013 | Sakata et al. | |
| 2013/0198076 A1 | 8/2013 | Zambelli Hosmer et al. | |
| 2013/0218683 A1 | 8/2013 | Hannan | |
| 2013/0246207 A1 | 9/2013 | Novak et al. | |
| 2013/0246301 A1 | 9/2013 | Radhakrishnan et al. | |
| 2013/0282490 A1 | 10/2013 | Kramer et al. | |
| 2014/0108173 A1 | 4/2014 | Cooper et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0156531 A1 | 6/2014 | Poon et al. | |
| 2014/0278609 A1 | 9/2014 | Capps | |
| 2014/0279106 A1* | 9/2014 | Smelcer | G06Q 20/36 705/21 |
| 2014/0310182 A1 | 10/2014 | Cummins | |
| 2015/0031393 A1 | 1/2015 | Post et al. | |
| 2015/0046339 A1 | 2/2015 | Wong et al. | |
| 2015/0120509 A1 | 4/2015 | Moring et al. | |
| 2015/0310419 A1 | 10/2015 | Kadaster et al. | |
| 2015/0310470 A1 | 10/2015 | Mathew et al. | |
| 2015/0339638 A1 | 11/2015 | DeLuca | |
| 2015/0339648 A1 | 11/2015 | Kushevsky et al. | |
| 2016/0189142 A1 | 6/2016 | Chandru et al. | |

OTHER PUBLICATIONS

Warnick, M., "Think You can't use that your not yet activated credit card? Think Again," Sticker, dated Sep. 23, 2009, Retrieved from Internet URL: http://www.creditcards.com/credit-card-news/sticker-activate-new-credit-card-1282.php, on Aug. 30, 2017, pp. 1-6.

Non-Final Office Action dated Nov. 2, 2017, for U.S. Appl. No. 14/453,526, of Jowdy, J., M., filed Aug. 6, 2014.

Non-Final Office Action dated Nov. 15, 2017, for U.S. Appl. No. 15/640,321, of Grassadonia, B., et al., filed Jun. 30, 2017.

Non-Final Office Action dated Mar. 9, 2018, for U.S. Appl. No. 14/747,805, of Kim, W., et al., filed Jun. 23, 2015.

"Activating vs. Registering Credit Cards," Discover, Retrieved from the Internet URL: https://www.discover.com/credit-cards/resources/registering-credit-cards, pp. 1-5 (May 25, 2018).

Hamm, T., "10 Simple Ways to Beat Impulse Buying," The Simple Dollar, Retrieved from the Internet URL: https://www.thesimpledollar.com/10-simple-ways-to-beat-impulse-buying/, pp. 1-9.

Final Office Action dated Jun. 1, 2018, for U.S. Appl. No. 14/453,526, of Jowdy, J.M., filed Aug. 6, 2014.

Final Office Action dated Jun. 4, 2018, for U.S. Appl. No. 15/640,321, of Grassadonia, B., et al., filed Jun. 30, 2017.

Non-Final Office Action dated Aug. 10, 2018, for U.S. Appl. No. 15/941,797, of Bricca, G., et al., filed Mar. 30, 2018.

Notice of Allowance dated Sep. 20, 2018, for U.S. Appl. No. 14/747,805, of Kim, W., et al., filed Jun. 23, 2015.

Non Final Office Action dated Jan. 14, 2019, for U.S. Appl. No. 15/640,321, of Grassadonia, B., et al., filed Jun. 30, 2017.

Non-Final Office Action dated Jan. 28, 2019, for U.S. Appl. No. 14/453,526, of Jowdy, J.M., filed Aug. 6, 2014.

International Search Report and Written Opinion for International Application No. PCT/US2018/039756, dated Nov. 15, 2018.

Final Office Action dated Mar. 22, 2019, for U.S. Appl. No. 15/941,797, of Bricca,G., et al. filed Mar. 30, 2018.

\* cited by examiner

MERCHANT PERFORMED BANKING-TYPE TRANSACTIONS

BACKGROUND

Banking today is typically done with banks or credit unions. To open an account, a customer can visit a branch office of a bank or a credit union. The customer has to establish his or her identity, typically using a form of government issued identification, such as a state issued driver's license or identification card, or a federal government issued passport. The customer further needs to provide an address. Once the identity of the customer is established, the bank or credit union can create an account, such as a checking account or a savings account, for the customer. Upon creation of the account, the customer is able to perform transactions with the bank or credit union, such as making a deposit or a withdrawal.

The customer can make a deposit at a branch office of the bank or credit union, or using an automated teller machine (ATM). To make a deposit in a branch office, the customer typically identifies her account to a teller, and provides some form of money to the teller, such as cash or a check. The teller arranges for the account of the customer to be credited for the amount of the deposit. To make a deposit using an ATM, the customer inserts an ATM or debit card into an ATM. The customer then enters her personal identification number (PIN) into the ATM, and the ATM validates the PIN. Once validated, the ATM accepts some form of money from the customer, and credits the customer's account for the amount of the deposit.

The customer can similarly make a withdrawal at a branch office of the bank or credit union, or using an ATM. To make a deposit in a branch office, the customer typically identifies her account to a teller, and establishes their identity by providing a form of government issued identification. The teller arranges for the account of the customer to be debited for the amount of the withdrawal. When the account has sufficient funds available for the withdrawal, the teller provides funds in the amount of the withdrawal to the customer. To make a withdrawal using an ATM, the customer inserts an ATM or debit card into an ATM. The customer then enters her PIN into the ATM, and the ATM validates the PIN. Once validated, the ATM verifies that the customer's account has sufficient funds available for the withdrawal. If the funds are available, the ATM provides funds in the amount of the withdrawal to the customer.

BRIEF DESCRIPTION OF THE DRAWINGS

Embodiments of the present disclosure will be described and explained through the use of the accompanying drawings in which.

Figure 1A:
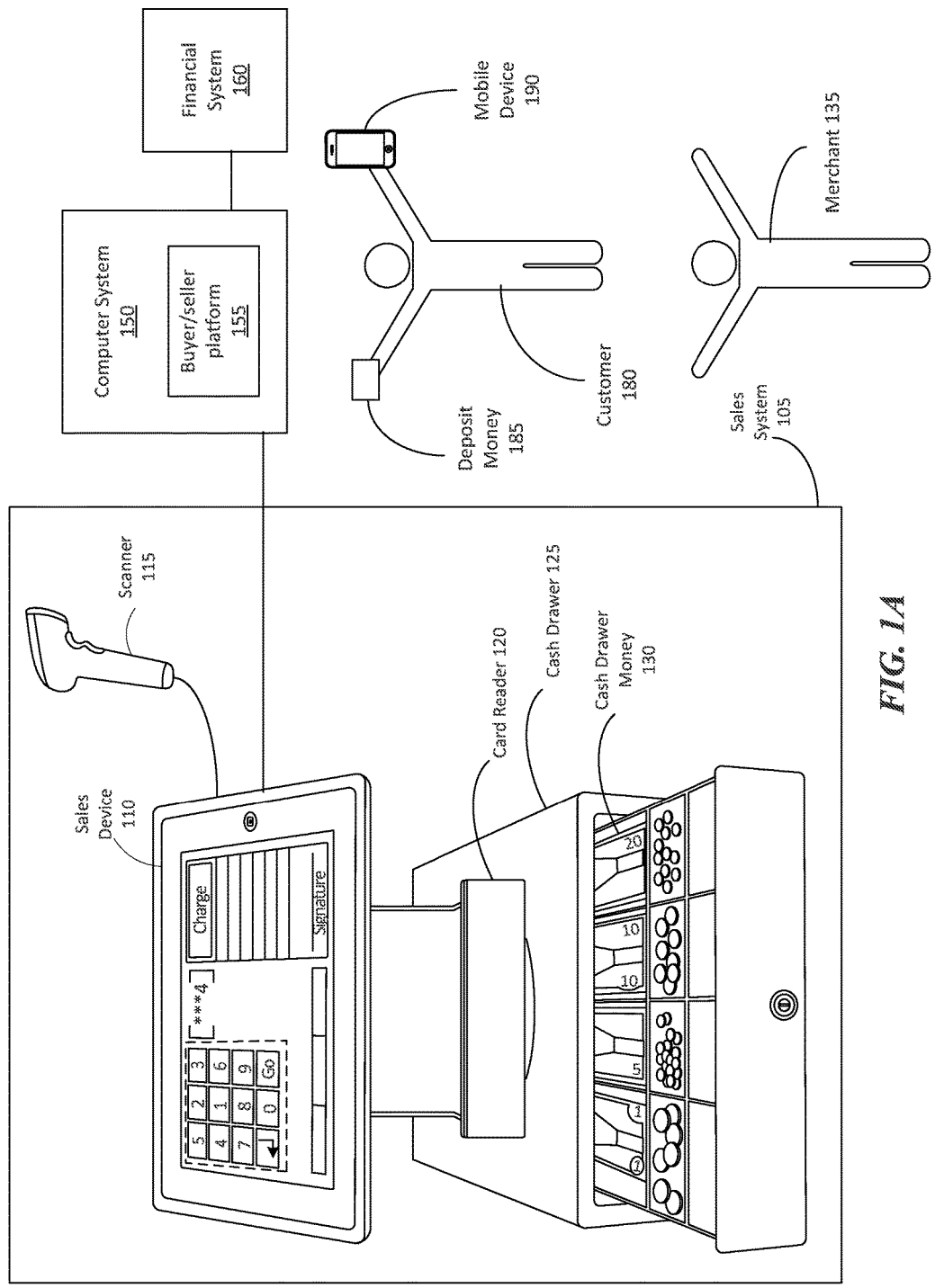
FIG. 1A is a diagram illustrating components of or associated with a first embodiment of a system to enable a merchant to perform banking-type transactions.

The drawings are not necessarily drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the technology of the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

This application discloses technology related to enabling a merchant to perform banking-type transactions, such as a deposit or a withdrawal. A merchant, using a sales system such as a point of sales system that the merchant uses to sell goods, can perform banking-type transactions for a customer. The sales system can send information related to the banking-type transaction to, for example, a buyer/seller platform. The buyer/seller platform can enable merchants to engage in financial transactions with customers for the sale of goods and/or services, and can process the electronic payments (e.g., credit card or ATM payments) associated with the financial transactions. The buyer/seller platform can deposit the funds from the electronic payments into the merchants' financial accounts.

When the banking-type transaction is a deposit, the customer can provide the deposit amount to the merchant. The buyer/seller platform can credit the customer's financial account for the deposit amount. The platform can accomplish the credit of the account by diverting a portion of the merchant's electronic payment funds corresponding to the deposit amount to the customer's financial account. While this diversion reduces the electronic funds that are deposited in the merchant's financial account by an amount corresponding to the customer's deposit, the merchant's funds remain whole. The merchant's funds remain whole as, on the plus side, the merchant received the cash deposit amount from the customer, and, on the minus side, had the electronic payment funds deposit reduced by the amount of the deposit.

Many people do not have convenient access to banks and/or credit unions when they need access. For example, a person in a rural area may need to drive a significant distance to go to a bank, or a worker getting off work at midnight may not be able to find an open bank. Utilizing the disclosed technology, these people can perform banking-type transactions with a merchant. For example, the person in the rural area can go to a local grocery store or gas station and make a deposit to a financial account. The worker getting off work at midnight can go to a 24-hour convenience store and make a withdrawal from a financial account.

Additionally, many business people, for example taxi drivers, may accept payment cards (e.g., credit cards or ATM cards) to purchase goods and/or services and not have timely access to those payment card funds. For example, if a taxi driver receives $100 in payment card payments during a shift, the taxi driver may not be able to obtain the $100 till the next day or even later. Utilizing the disclosed technology, the taxi driver can go to a merchant immediately following his shift and withdraw the $100 of payment card payments he received during his shift, and the merchant can provide $100 in cash to the taxi driver for the withdrawal.

Further, many people around the world do not have an account with a bank or a credit union. Resultantly, a person may not have a safe place to keep her money. There are many reasons why a person may not be able to open an account. For example, the person may not have government issued ID (identification) to use to open the account, or the person may not have an address, which can be required to open an account. For such people, not having reasonable access to an account where money can be safely kept creates a hardship. Utilizing the disclosed technology, a person without a government issued ID or an address can go to a local store of a merchant, and the merchant can open a financial account for the person. The merchant can further perform banking-type transactions for the person, for example depositing funds into the financial account where the funds can be safely stored.

Walking through a simple example may be helpful in understanding the disclosed technology. The following non-limiting example is provided to help in understanding the basics of the disclosed technology. A merchant uses a sales system to open a financial account for a customer. The sales system is the same system that the merchant uses to sell goods, such as food and medicine. Because the customer does not have government issued ID, an alternative method of establishing identity can be used. The sales system can communicate with a computer system that has access to personal information databases. For example, the computer system can obtain personal information from databases of credit reporting agencies, such as Experian, Equifax, and TransUnion.

The computer system, using personal information from the databases, can create and transmit personal questions to the sales system, which the customer can answer to establish identity. For example, the computer system could ask what was the customer's residence address five years ago, or what is the current outstanding balance for the customer's cell phone. The computer system could provide several possible answers from which the customer would choose. If the customer is able to answer sufficient personal questions correctly to establish her identity, the computer system can create a financial account for the customer. The customer can now make banking-type transactions, such as deposits or withdrawals, with the merchant or any other merchant that utilizes the disclosed technology.

For example, the customer can go to a second store, and can make a deposit with a second merchant at the second store. To determine the customer's account, the second merchant can use a sales system to obtain identifying information from the customer's cell phone. The sales system can transmit this identifying information to the computer system, and the computer system can determine the financial account associated with the cell phone. The second merchant can accept a cash deposit from the customer, and, using the sales system, can cause the financial account of the customer to be credited for the amount of the deposit.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," "various embodiments," "some embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) components. Modules are typically functional components that can generate useful data or other output using specified input(s). A module may or may not be self-contained. An application program (also called an "application") may include one or more modules, or a module can include one or more application programs.

FIG. 1A is a diagram illustrating components of or associated with a first embodiment of a system to enable a merchant to perform banking-type transactions. FIG. 1A includes buyer/seller platform 155, which can be implemented on a computer system, such as computer system 150. Computer system 150 can be computer system 800 of FIG. 8, and can be referred to as a networked computer system. Buyer/seller platform 155 can enable merchants to engage in financial transactions with customers for the sale of goods and/or services, can process the electronic payments associated with the financial transactions, and can deposit funds from the electronic payments to financial accounts associated with the merchants.

For example, customer 180 can purchase a good from merchant 135, and can enter into a financial transaction associated with the purchase. The financial transaction can include a payment by customer 180 for the good, and the payment can be made by customer 180 using a payment card, such as a credit card or an ATM card. The payment card can be read by card reader 120, and the payment card and purchase transaction information can be sent to buyer/seller platform 155 via computer system 150. In some embodiments, buyer/seller platform 155 can receive the payment card and purchase transaction information, and can process the electronic payment made using the payment card utilizing financial system 160. Buyer/seller platform 155 can obtain the electronic payment funds from a financial account associated with the payment card, and can transfer the electronic payment funds to a financial account associated with merchant 135.

In one example, customer 180 desires to open an account to safely hold customer 180's money. However, customer 180 may not be able to open an account with or have reasonable access to a bank or a credit union for some of the previously discussed reasons. Customer 180 can enter a place of business for a merchant, such as a grocery store run by merchant 135. Merchant 135 sells goods, such as food and medicine, and uses sales system 105 to sell the goods. Sales system 105 is configured to be used by merchant 135 to sell the goods, and can communicate with buyer/seller platform 155.

Customer 180 asks merchant 135 to open a financial account. Merchant 135, using sales system 105, opens an account for customer 180, for example, at buyer/seller platform 155. If customer 180 does not have proper identification, merchant 135 can use sales system 105 to arrange for an alternate method of identification. For example, merchant 135 can use sales system 105 to indicate that customer 180 wants to open an account but does not have the proper identification. Sales system 105 can communicate with buyer/seller platform 155, and buyer/seller platform 155 can provide an alternative method of identifying customer 180.

As one example of an alternative method of identifying customer 180, buyer/seller platform 155 can transmit personal questions to sales system 105 which customer 180 can answer to verify identity. The personal questions can include, for example, what was customer 180's residence address five years ago, and can list a number of possible answers to select from. As a second example, the personal questions can include what is customer 180's current outstanding phone bill balance and can list a number of possible answers to select from. After verifying customer 180's identity, merchant 135 can create a financial account for customer 180 using sales system 105. For example, sales system 105 can transmit account creation information to buyer/seller platform 155, and buyer/seller platform 155 can create the financial account for customer 180.

Additional information can be linked to or associated with the financial account for various purposes. For example, for use as part of an identification verification process, or to facilitate locating the financial account. As a first example, the financial account can be linked to mobile device 190. Sales system 105 can obtain identifying information from mobile device 190, and can transmit the identifying information to buyer/seller platform 155. Buyer/seller platform 155 can have access to a storage device on computer system 150. The storage device can contain a mapping database and buyer/seller platform 155 can use the mapping database to associate or link the identifying information with the financial account.

As a second example, customer 180 can enter a personal identification number (PIN) which can be linked to the financial account. Customer 180 can enter a PIN, for example using sales system 105 or mobile device 190, and the PIN can be transmitted to buyer/seller platform 155. Buyer/seller platform 155 can use the mapping database to associate or link the PIN with customer 180's financial account. As a third example, a photo of customer 180 can be linked to the financial account. A photo of customer 180 can be taken, for example by sales system 105 or mobile device 190, and the photo can be transmitted to buyer/seller platform 155. Buyer/seller platform 155 can use the mapping database to associate or link the photo with customer 180's financial account.

Once customer 180's financial account is created, customer 180 can perform banking-type transactions, such as a making a deposit or a withdrawal, utilizing the financial account. To make a deposit, customer 180 can provide deposit money 185 to merchant 135, which merchant 135 can place in cash drawer 125.

In some embodiments, the identity of customer 180 can be verified as part of making a banking-type transaction, such as a deposit or a withdrawal. In some embodiments, to verify the identity of customer 180, customer 180 can enter a PIN using, for example, sales system 105 or mobile device 190. Sales system 105 can obtain identifying information from mobile device 190, and can transmit the identifying information and the PIN to buyer/seller platform 155. Buyer/seller platform 155 can execute a database operation using the mapping database to obtain account information including the PIN for the financial account associated with the identifying information. In some embodiments, validation of the PIN completes the verification of the identity of customer 180.

In some embodiments, merchant 135 can use a photo to verify the identity of customer 180. Sales system 105 can obtain identifying information from mobile device 190, and can transmit the identifying information to buyer/seller platform 155. Buyer/seller platform 155 can execute a database operation using the mapping database to obtain account information including a photo for the financial account associated with the identifying information. Buyer/seller platform 155 can transmit the photo to sales system 105, and merchant 135 can use the photo to validate the identity of customer 180. In some embodiments, identity validation using the photo completes the verification of the identity of customer 180. In other embodiments, both validation using the PIN and validation using the photo are needed to complete the verification of the identity of customer 180. A person having ordinary skill in the art will appreciate that many other methods of verifying the identity of customer 180 exist and can be used.

Continuing with customer 180's deposit, merchant 135 can obtain identifying information from mobile device 190 using sales system 105. Sales system 105 can transmit the amount of customer 180's deposit and the identifying information to buyer/seller platform 155. Computer system 150 can include a storage device containing a mapping database that associates the identifying information with the financial account, and buyer/seller platform 155 can access the mapping database. Buyer/seller platform 155 can execute a database operation using the mapping database to obtain account information for the financial account associated with the identifying information. Having the account information for customer 180's financial account, buyer/seller platform 155 can credit the financial account for the amount of customer 180's deposit, less a transaction fee. In some embodiments, the transaction fee can be zero.

Computer system 150 can include a storage device containing a mapping database that associates sales system 105 with a financial account of the merchant (i.e., the merchant's financial account), and buyer/seller platform 155 can access the mapping database. Buyer/seller platform 155 can determine the merchant's financial account by executing a database operation using the mapping database to obtain account information for the financial account associated with sales system 105. When customer 180's deposit is successful, buyer/seller platform 155 can debit the merchant's financial account for the amount of the customer's cash deposit less a transaction fee. In some embodiments, the transaction fee can be zero.

To make a withdrawal, customer 180 makes a withdrawal request for a specified amount of money (i.e., the amount of customer 180's withdrawal request). For a withdrawal, the identity of customer 180 typically needs to be verified. The identity of customer 180 can be verified using a process, such as one of the previously described identity verification processes. Sales system 105 can obtain identifying information from mobile device 190. Sales system 105 can transmit the amount of customer 180's withdrawal request and the identifying information to buyer/seller platform 155. Buyer/seller platform 155 can execute a database operation using the mapping database to obtain account information, including an account balance, for the financial account associated with the identifying information.

When the account balance is sufficient to fund customer 180's withdrawal request, buyer/seller platform 155 can transmit a confirmation message to sales system 105. Buyer/seller platform 155 can debit customer 180's financial account for the amount of the withdrawal. In some embodiments, customer 180's financial account is debited for a transaction fee. Buyer/seller platform 155 can determine the merchant 135's financial account by executing a database operation using the mapping database to obtain account information for the financial account associated with sales system 105. When customer 180's withdrawal is successful, buyer/seller platform 155 can credit merchant 135's financial account for the amount of the customer's cash deposit plus a transaction fee. In some embodiments, the second transaction fee can be zero.

With the identity of customer 180 having been verified, and with the withdrawal request confirmed by buyer/seller platform 155, merchant 135 can provide the requested amount of the withdrawal to customer 180. Typically, merchant 135 takes money from cash drawer money 130 to provide the requested withdrawal amount to customer 180. In some embodiments, merchant 135 can provide the requested withdrawal amount less a transaction fee to customer 180.

Figure 1B:
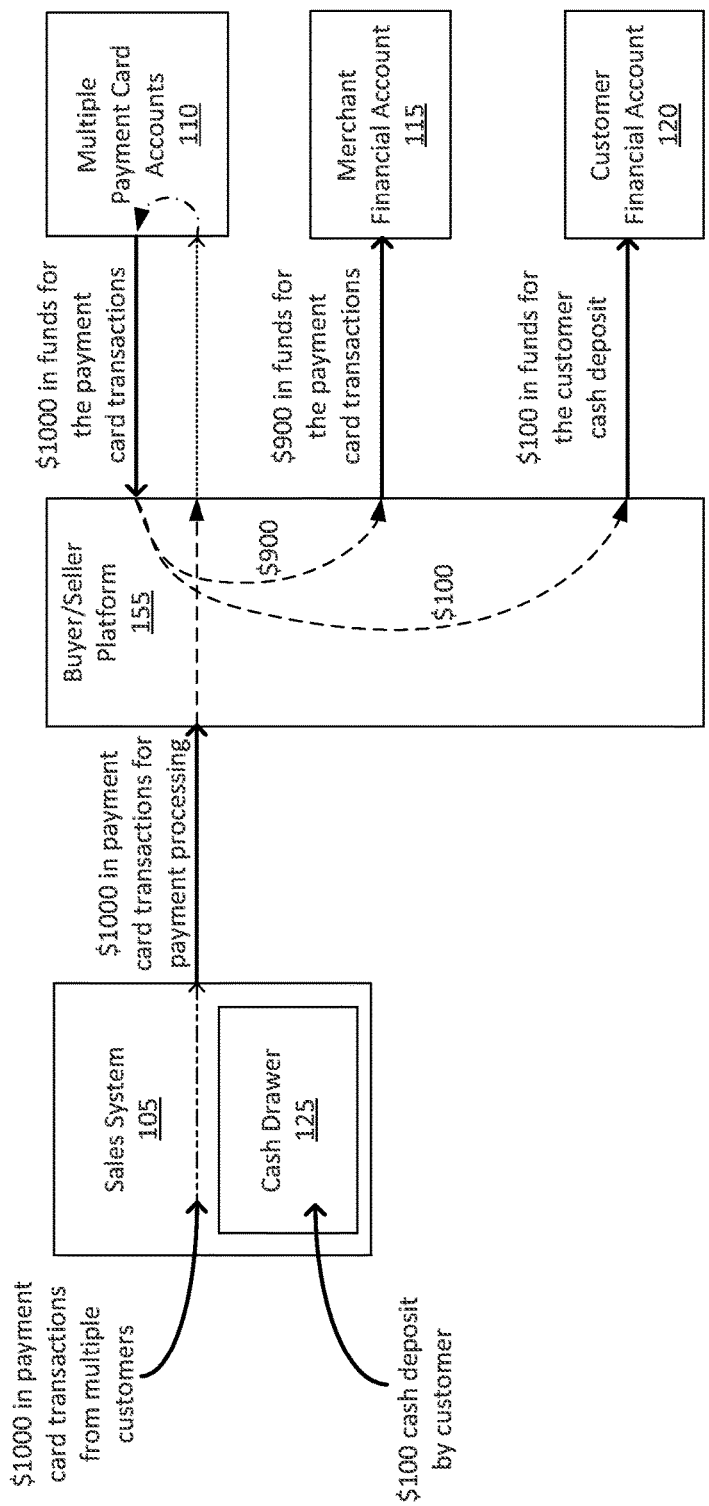
FIG. 1B is a diagram illustrating the flow of funds for a cash deposit made with a merchant by a customer.

FIG. 1B is a diagram illustrating the flow of funds for a cash deposit made with a merchant by a customer. The following description of FIG. 1B will be described using the system illustrated in FIG. 1A, and will refer to labels of that figure. This is a non-limiting example and is done with the intent of making the description of FIG. 1B easier to understand.

It is instructive to trace the flow of funds for a cash deposit. In the example of FIG. 1B, a customer such as customer 180 desires to deposit $100 into a financial account, such as customer financial account 120. Customer financial account 120 can be at buyer/seller platform 155, or can be at financial system 160. When at financial system 160, customer financial account 120 can be at a bank or credit union associated with financial system 160, among other locations. FIG. 1B shows a "$100 deposit by customer" going into cash drawer 125. For example, customer 180 provides deposit money 185, in this example $100, to merchant 135, who places the money in cash drawer 125.

During that same day, merchant 135 sells $1500 of goods and/or services to various customers. The customers pay for $1000 of the goods and/or services using payment cards, such as credit cards or ATM cards, and pay for $500 of the goods and/or services with cash, the cash placed in cash drawer 125. FIG. 1B shows "$1000 in payment card transactions from multiple customers" going into sales system 105, for example, by swiping the payment cards through card reader 120 to pay for the associated purchases.

Sales system 105 can send the purchase transaction and payment card information to buyer/seller platform 155 for processing of the payment card transactions. FIG. 1B shows sales system 105 sending "$1000 in payment card transactions for payment processing" to buyer/seller platform 155. As part of processing the payment card transactions, buyer/seller platform 155 obtains funds from accounts associated with the payment cards. For example, if 5 customers each purchased $200 of goods and/or services each using a personal payment card, buyer/seller platform 155 would collect $200 from the account associated with each of the personal payment cards. Since this example has 5 payment cards used, each with an associated account, buyer/seller platform 155 would collect $200 from the 5 accounts associated with the 5 payment cards, the 5 accounts comprising multiple payment card accounts 110. FIG. 1B shows buyer/seller platform 155 obtaining "$1000 in funds for the payment card transactions" from multiple payment card accounts 110.

Merchant 135 made $1500 in sales for the day, so merchant 135 (ignoring the various fees and transaction costs associated with the fund transfers) should end the day with $1500 more in funds than he started with. Merchant 135 received $500 in cash in payment for goods and/or services, and received a $100 deposit. So cash drawer 125 has $500+$100 or $600 more in funds than at the start of the day. Of the $1000 in payment card funds, FIG. 1B shows "$900 in funds for the payment card transactions" going to merchant financial account 115. Merchant financial account 115 is a financial account associated with merchant 135. Merchant financial account 115 can be at buyer/seller platform 155, or can be at financial system 160. When at financial system 160, merchant financial account 115 can be at a bank or credit union associated with financial system 160, among other locations. At the end of the day, cash drawer 125 has $600 more in funds and merchant financial account 115 has $900 more in funds than at the start of the day, so merchant 135 has $600+$900=$1500 more in funds at the end of the day than he started with.

Customer 180 provided a deposit amount of $100 to merchant 135 that customer 180 wanted deposited in customer financial account 120. Of the "$1000 in funds for the payment card transactions" that are transferred from multiple payment card accounts 110 to buyer/seller platform 155, "$100 in funds for the cash deposit" are transferred from buyer/seller platform 155 to customer financial account 120. So the "$1000 in funds for the payment card transactions" are split by buyer/seller platform 155 with "$900 in funds for the payment card transactions" being deposited in merchant financial account 115, and "$100 in funds for the customer cash deposit" being deposited in customer financial account 120.

Figure 1C:
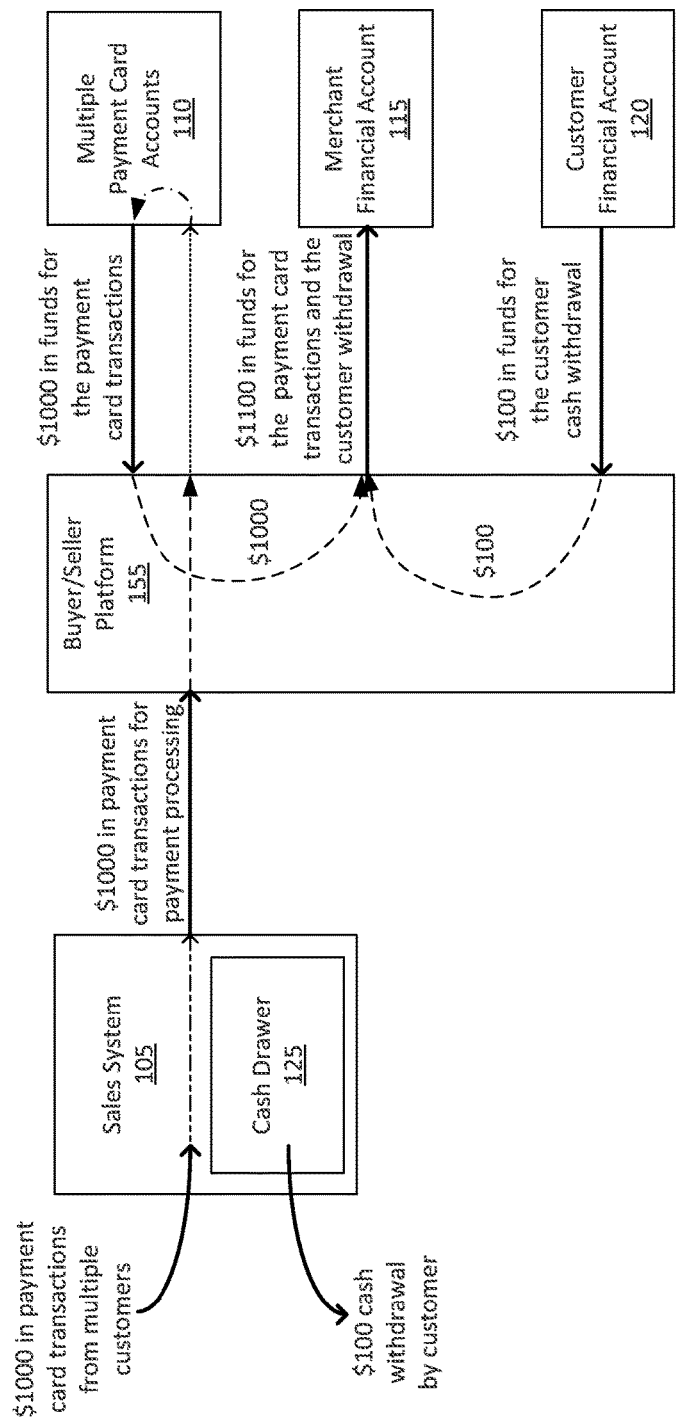
FIG. 1C is a diagram illustrating the flow of funds for a cash withdrawal made with a merchant by a customer.

FIG. 1C is a diagram illustrating the flow of funds for a cash withdrawal made with a merchant by a customer. The following description of FIG. 1C will be described using the system illustrated in FIG. 1A, and will refer to labels of that figure. This is a non-limiting example and is done with the intent of making the description of FIG. 1C easier to understand.

It is instructive to trace the flow of funds for a cash withdrawal. In the example of FIG. 1C, a customer such as customer 180 desires to withdraw $100 from a financial account, such as customer financial account 120. FIG. 1C shows a "$100 cash withdrawal by customer" going from cash drawer 125 to the customer. For example, merchant 135 provides money from cash drawer 125, in this example $100, to customer 180.

During that same day, merchant 135 sells $1500 of goods and/or services to various customers. The customers pay for $1000 of the goods and/or services using payment cards, and pay for $500 of the goods and/or services with cash, the cash placed in cash drawer 125. FIG. 1C shows "$1000 in payment card transactions from multiple customers" going into sales system 105, for example, by swiping the payment cards through card reader 120 to pay for the associated purchases.

Sales system 105 can send the purchase transaction and payment card information to buyer/seller platform 155 for processing of the payment card transactions. FIG. 1C shows sales system 105 sending "$1000 in payment card transactions for payment processing" to buyer/seller platform 155. FIG. 1C shows buyer/seller platform 155 obtaining "$1000 in funds for the payment card transactions" from multiple payment card accounts 110.

Merchant 135 made $1500 in sales for the day, so merchant 135 (ignoring the various fees and transaction costs associated with the fund transfers) should end the day with $1500 more in funds than he started with. Merchant 135 received $500 in cash in payment for goods and/or services, and paid out $100 for the cash withdrawal. So cash drawer 125 has $500−$100 or $400 more in funds than at the start of the day. Of the $1000 in payment card funds, FIG. 1C shows "$1000 in funds for the payment card transactions" going to merchant financial account 115. FIG. 1C shows "$100 in funds for the customer cash withdrawal" going from customer financial account 120 to buyer/seller platform 155, and then from buyer/seller platform 155 to merchant financial account 115. At the end of the day, cash drawer 125 has $400 more in funds and merchant financial account 115 has $1000+$100 or $1100 more in funds than at the start of the day, so merchant 135 has $400+$1100=$1500 more in funds at the end of the day than he started with.

Customer 180 obtained $100 from merchant 135 that customer 180 wanted to withdraw from customer financial account 120. "$100 in funds for the customer cash withdrawal" is withdrawn from customer financial account 120 and is deposited to merchant financial account 115. This results in customer financial account 120 having $100 less than at the start of the day, as should be the case given that customer 180 wanted to withdraw $100 from customer financial account 120.

The customer of FIGS. 1A-1C, for example customer 180, can also be a second merchant, and customer financial account 120 can be a second merchant financial account for the second merchant. The second merchant, similar to merchant 135, can make sales that are paid for with payment cards, and buyer/seller platform 155 can process those payment card payments and deposit funds obtained from accounts associated with the payment cards into the second merchant financial account. When the second merchant makes a deposit or withdrawal at the first merchant, rather than buyer/seller platform 155 making a deposit to or withdrawal from the second merchant financial account that directly corresponds to the amount of the deposit or withdrawal, buyer/seller platform 155 can adjust the payment card fund deposit into the second merchant financial account corresponding to the amount of the deposit or withdrawal.

For example, the second merchant can deposit $100 at the first merchant to go to the second merchant financial account. The second merchant can make $1000 in payment card sales that same day. Buyer/seller platform 155, rather than depositing $100 directly into the second merchant financial account, can make one deposit of $1100, the one deposit including the $1000 of payment card funds plus the $100 deposit amount. Similarly, if the second merchant withdraws $100 at the first merchant from the second merchant financial account, buyer/seller platform 155 can make one deposit of $900, the one deposit including the $1000 of payment card funds less the $100 withdrawal. A person of ordinary skill will appreciate that the various transfer/deposit amounts can be adjusted based on various fees and charges that are associated with the various transactions, and that more than one deposit to or withdrawal from the second merchant financial account can be made.

Figure 2:
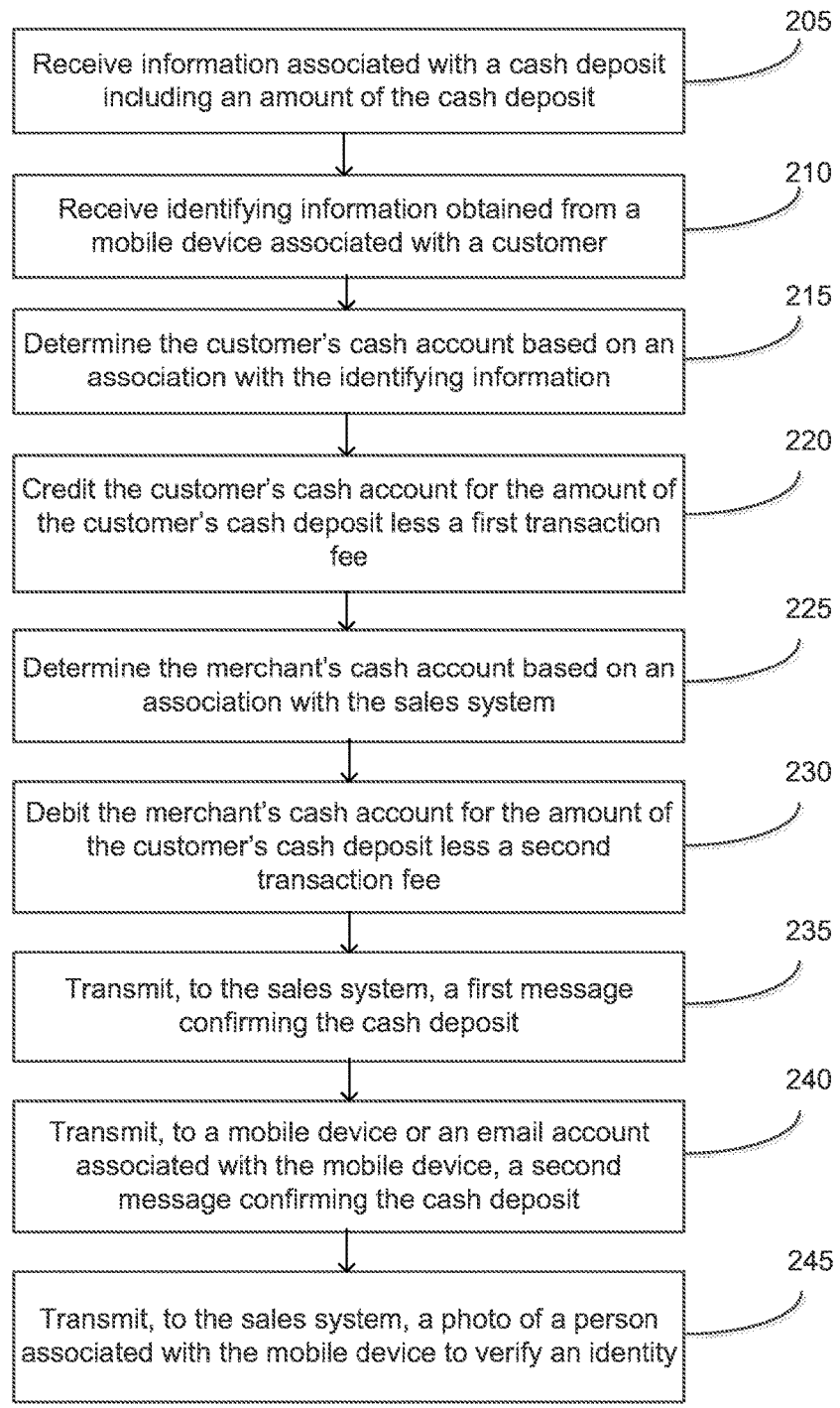
FIG. 2 is a flow chart illustrating operations of a method for a customer to make a cash deposit.

FIG. 2 is a flow chart illustrating operations of a method for a customer to make a cash deposit. The following description of FIG. 2 will be described using the system illustrated in FIG. 1A, and will refer to labels of that figure. This is a non-limiting example and is done with the intent of making the description of FIG. 2 easier to understand. Note that, in some embodiments, including the embodiment of FIG. 1A, all steps of the method of FIG. 2 can be carried out by computer system 150 as well as buyer/seller platform 155. In some embodiments, some or all transaction fees associated with the steps of FIG. 2 are zero.

Step 205 includes receiving information associated with the cash deposit including an amount of the cash deposit. The cash deposit can be the customer's cash deposit. The information can be from a sales system configured to be used by a merchant to sell goods. Using the example of FIG. 1A, customer 180 initiates a deposit transaction and provides deposit money 185 to merchant 135. Merchant 135 uses sales system 105 to sell goods, and sales system 105 is configured to be used by merchant 135 to sell goods. Sales system 105 can transmit the amount of customer 180's deposit to computer system 150 and/or buyer/seller platform 155. Step 205 can include computer system 150 and/or buyer/seller platform 155 receiving, from sales system 105, which is configured to be used by merchant 135 to sell goods, information associated with a cash deposit including an amount of customer 180's cash deposit.

Step 210 includes receiving identifying information obtained from a mobile device associated with a customer. The identifying information can be sent by the sales system and the mobile device can be the customer's mobile device. Step 210 can occur before or after step 205. Using the example of FIG. 1A, merchant 135 can obtain identifying information from mobile device 190 using sales system 105. Sales system 105 can transmit the identifying information to computer system 150 and/or buyer/seller platform 155. Step 210 can include computer system 150 and/or buyer/seller platform 155 receiving, from sales system 105, identifying information obtained from mobile device 190, which is associated with customer 180.

Step 215 includes determining the customer's cash account based on an association with the identifying information. Step 215 can occur in response to step 210 or can occur before or after step 205. Using the example of FIG. 1A, computer system 150 can include a storage device containing a mapping database that associates the identifying information with the customer's financial account. The customer's cash account can be determined by computer system 150 and/or buyer/seller platform 155 performing a database operation to determine a cash account associated with the identifying information. Step 215 can include computer system 150 and/or buyer/seller platform 155 determining the customer's cash account based on an association with the identifying information, such as by performing a database operation to determine a cash account associated with the identifying information.

Step 220 includes crediting the customer's cash account for the amount of the customer's cash deposit less a first transaction fee. Step 220 can occur in response to steps 215 and 205. In step 215 the customer's cash account was determined. Using the example of FIG. 1A, step 220 can include computer system 150 and/or buyer/seller platform 155 crediting customer 180's financial account for the amount of customer 180's cash deposit, less a first transaction fee. In some embodiments, the first transaction fee is zero. In some embodiments the financial account is a cash account.

In some embodiments, the funds for the deposit can come from funds obtained from accounts associated with payment cards. This flow of funds is similar to FIG. 1B where the "$100 in funds for the customer cash deposit" going to customer financial account 120 can come from multiple payment card accounts 110. The "$1000 in payment funds for the payment card transactions" that was obtained from multiple payment card accounts 110 go to buyer/seller platform 155, which sends the "$100 in funds for the customer cash deposit" to customer financial account 120. Step 220 can have a flow of funds that is similar to FIG. 1B.

Step 225 includes determining the merchant's cash account based on an association with the sales system. Step 225 can occur before all of or after any of steps 205-220. Using the example of FIG. 1A, computer system 150 can include a storage device containing a mapping database that associates sales system 105 with a financial account of the merchant (i.e., the merchant's financial account). In some embodiments, a financial account is a cash account. Step 225 can include computer system 150 and/or buyer/seller platform 155 determining the merchant's financial account based on an association with the sales system, such as by executing a database operation using the mapping database to obtain account information for the financial account associated with sales system 105.

Step 230 includes debiting the merchant's cash account for the amount of the customer's cash deposit less a second transaction fee. Step 230 can occur in response to step 225 or step 220 or step 205. Using the example of FIG. 1A, step 230 can include computer system 150 and/or buyer/seller platform 155 debiting the merchant's financial account for the amount of customer 180's cash deposit less a second transaction fee. In some embodiments, the second transaction fee is zero. In some embodiments, the financial account is a cash account.

In some embodiments, rather than debiting the merchant's cash account, computer system 150 and/or buyer/seller platform 155 can reduce an amount of a deposit in the merchant's cash account by an amount corresponding to the amount of the customer's cash deposit. This flow of funds is similar to FIG. 1B. For a typical prior art merchant, $1000 in payment card transactions would lead to a deposit in the merchant's financial account of $1000 (ignoring various fees). In FIG. 1B, the deposit is reduced by the "$100 cash deposit by customer", so instead of depositing "$1000 in funds for the payment card transactions" in merchant financial account 115, "$900 in funds for the payment card transactions" is deposited in merchant financial account 115. The deposit is reduced by an amount corresponding to the "$100 in funds for the customer cash deposit." Step 230 can have a flow of funds that is similar to FIG. 1B.

Step 235 includes transmitting, to the sales system, a first message confirming the cash deposit. Step 240 can occur in response to steps 220 and 230. Using the example of FIG. 1A, step 235 can include computer system 150 and/or buyer/seller platform 155 transmitting, to sales system 105, a first message confirming the cash deposit to customer 180's financial account.

Step 240 includes transmitting, to a mobile device and/or an email account associated with the mobile device, a second message confirming the cash deposit. Step 240 can occur in response to steps 220 and 230, or before or after step 235. Using the example of FIG. 1A, in some embodiments, computer system 150 and/or buyer/seller platform 155 transmits to mobile device 190 a second message confirming the cash deposit to customer 180's financial account. In some embodiments, computer system 150 and/or buyer/seller platform 155 transmits to an email account associated with mobile device 190 a second message confirming the cash deposit to customer 180's financial account. In some embodiments, step 240 can include computer system 150 and/or buyer/seller platform 155 transmitting messages confirming the cash deposit to customer 180's financial account to mobile device 190 and/or to an email account associated with mobile device 190.

Step 245 includes transmitting, to the sales system, a photo of a person associated with the mobile device to verify an identity. Step 245 can occur after any of steps 205-215, or after all of steps 205-215, or before step 205, step 210, or steps 205 and 210. Using the example of FIG. 1A, in some embodiments, computer system 150 and/or buyer/seller platform 155 transmits, to sales system 105, a photo of customer 180. Customer 180 is associated with mobile device 190. Step 245 can include transmitting, to sales system 105, the photo of customer 180 to verify the identity of customer 180. For example, merchant 135 can compare the photo as displayed on sales system 105 to customer 180, and can verify the identity of customer 180 based on the comparison.

Figure 3:
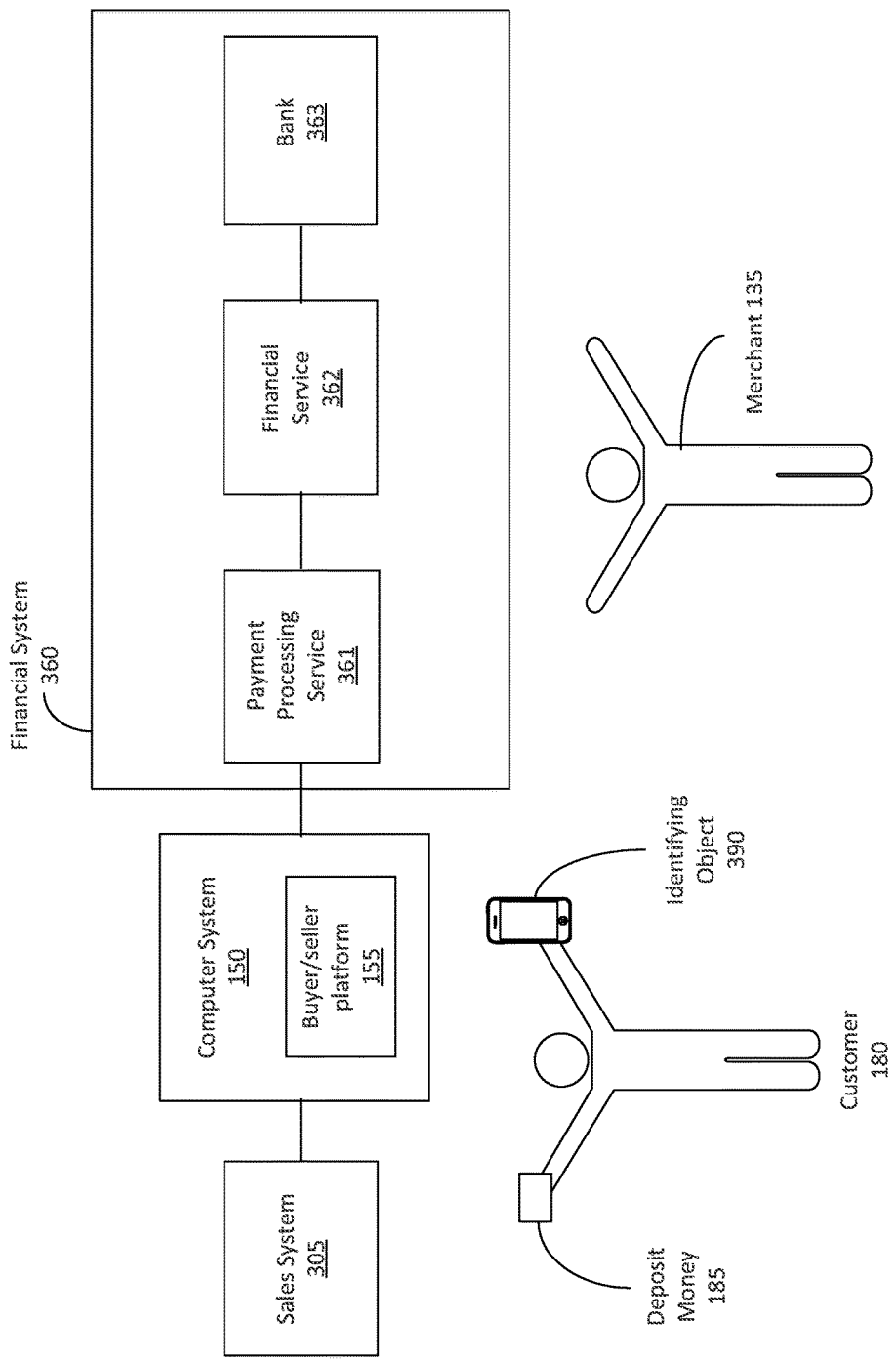
FIG. 3 is a diagram illustrating components of or associated with a second embodiment of a system to enable a merchant to perform banking-type transactions.

FIG. 3 is a diagram illustrating components of or associated with a second embodiment of a system to enable a merchant to perform banking-type transactions. FIG. 3 includes sales system 305, computer system 150, and financial system 360. Sales system 305 is coupled to computer system 150, and computer system 150 is coupled to financial system 360. In some embodiments, financial system 360 includes payment processing service 361, financial service 362, and bank 363. Computer system 150 is coupled to payment processing service 361, payment processing service 361 is coupled to financial service 362, and financial service 362 is coupled to bank 363.

Identifying object 390 is compatible with computer system 150. In various embodiments, identifying object 390 can be a magnetic stripe card, a smart card, a proximity card, a re-programmable magnetic stripe card, a card containing a quick response (QR) code, a card containing a bar code, a government issued identification card, a proxy card, or a biometrically identifiable object, such as a finger, a hand, an iris, a retina, or a face, among others. A proxy card is a card that can be associated with various payment mechanisms, examples of payment mechanisms including credit cards, charge cards, ATM cards, debit cards, pre-paid credit cards, pre-paid debit cards, gift cards, stored value cards, and fleet cards, among others. In some embodiments, identifying object 390 can be a mobile device.

Examples of mobile devices include smart phones such as an iPhone, tablets such as an iPad, portable media devices such as an iPod, wearable devices such as Google Glass or Samsung Smartwatch, or a laptop or other portable computer.

Sales system 305 can include systems that can perform the banking-type transactions including communicating with computer system 150, and that can be used by merchant 135 to sell goods. Examples of systems that can comprise sales system 305 include point of sale (POS) systems, cash registers, computer systems running sales applications including mobile devices running sales applications, cloud based POS systems, checkout registers, computer systems running internet based applications such as a web browser, and the like. A person of ordinary skill in the art will appreciate that there are many systems that can comprise sales system 305.

In some embodiments where identifying object 390 is a biometrically identifiable object, such as a finger, a hand, an iris, a retina, or a face, sales system 305 can identify the biometrically identifiable object. In some embodiments, sales system 305 can obtain biometric information from the biometrically identifiable object and can transmit the biometric information to a second computer system. The second computer system can use the biometric information to identify the biometrically identifiable object. For example, when the biometrically identifiable object is a finger, sales system 305 can obtain biometric information related to the fingerprint of the finger. In some embodiments, sales system 305 can recognize the fingerprint to identify the finger (e.g., this is the finger of Jane Doe). For example, sales system 305 can include a biometric scanner coupled to a computer system, such as a point of sale system. The biometric scanner can scan customer 180's fingerprint, can transmit the biometric scan results to the computer system to which the biometric scanner is coupled, and the computer system can use customer 180's fingerprint to identify the finger.

In some embodiments, sales system 305 can transmit the data related to the fingerprint to a second computer system. For example, to a compute server associated with the seller, to computer system 150, to financial system 360, to payment processing service 361, or to another computer system, and the second computer system can use the transmitted fingerprint data to identify the finger. The second computer system can transmit identifying information associated with the finger to sales system 305.

In some embodiments where identifying object 390 is a mobile device, sales device 105 can obtain identifying information associated with the mobile device. In some embodiments where identifying object 390 is a smart phone, sales system 305 can communicate with the smart phone via 3G to obtain identifying information related to a digital wallet associated with the smart phone. Sales system 305 in various embodiments can communicate with the mobile device via WiFi, 3G, 4G, Near Field Communication (NFC), or Bluetooth, or can obtain a QR code or a bar code or any machine readable code from the mobile device, for example, by scanning a QR code or bar code displayed by the mobile device. Sales system 305 can further transmit the identifying information to computer system 150.

In some embodiments, financial system 360 can include payment processing service 361, financial service 362, and bank 363. Payment processing service 161 can be, for example, Bank of America Merchant Services. Financial service 362 can be, for example, VISA's VisaNet Payment System. Bank 363 can be, for example, Chase Bank. A person having ordinary skill in the art will appreciate that there are a number of companies that provide payment processing services, financial services, and banking services, and that can provide the services of payment processing service 361, financial service 362, and bank 363, respectively.

Figure 4:
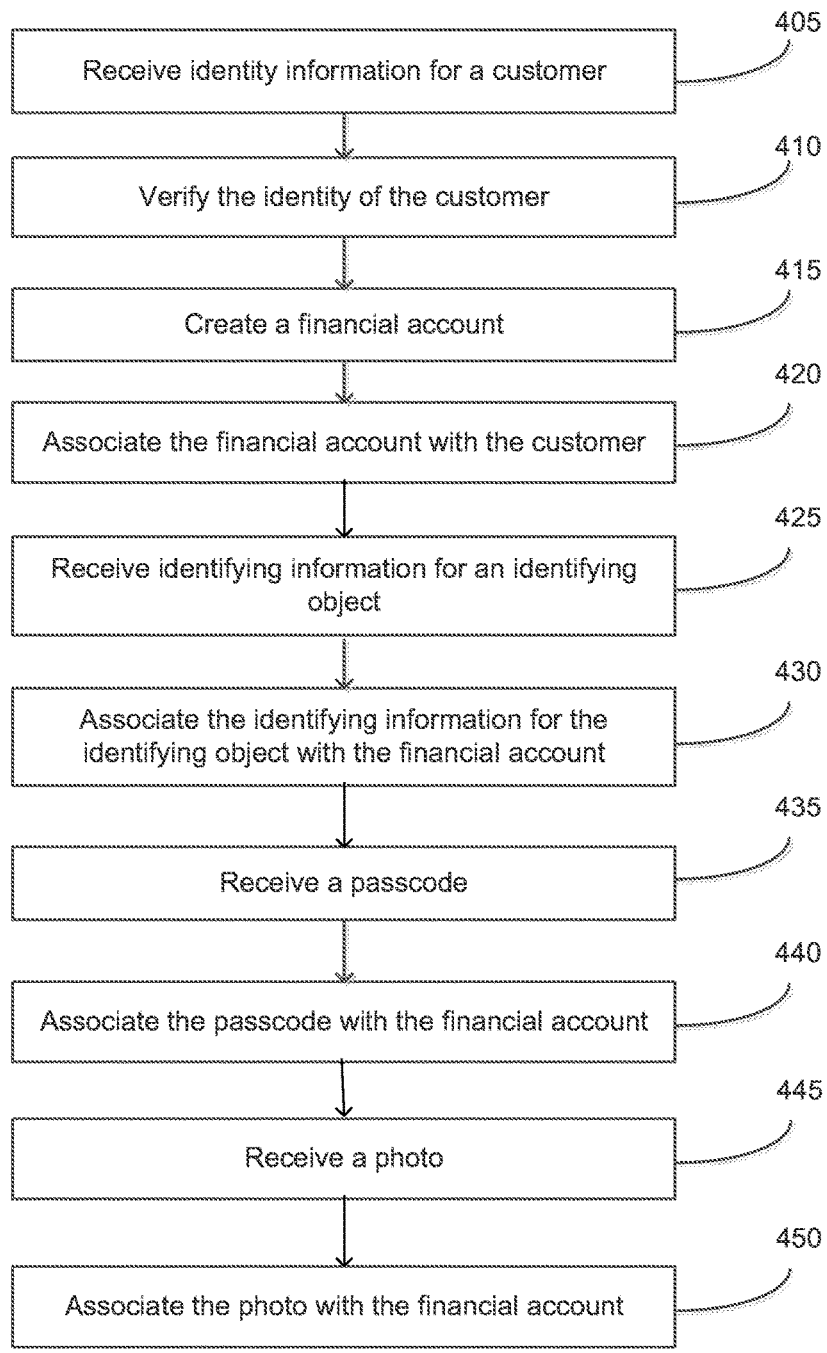
FIG. 4 is a flow chart illustrating operations of a method for creating a financial account.

FIG. 4 is a flow chart illustrating operations of a method for creating a financial account. The following description of FIG. 4 will be described using the system illustrated in FIG. 3, and will refer to labels of that figure. This is a non-limiting example and is done with the intent of making the description of FIG. 4 easier to understand. Note that, in some embodiments, including the embodiment of FIG. 3, all steps of the method of FIG. 4 can be carried out by computer system 150 and/or buyer/seller platform 155.

Step 405 includes receiving identity information for a customer. Using the example of FIG. 3, in some embodiments, customer 180 can enter a place of business for a merchant, such as coffee shop run by merchant 135. Merchant 135 sells goods, such as coffee and pastries, and uses sales system 305 to sell the goods. Sales system 305 is configured to be used by a merchant to sell goods. Customer 180 asks merchant 135 to open a financial account. Merchant 135, using sales system 305, begins the process of opening a financial account for customer 180. Customer 180 provides identity information, which can be entered into sales system 305 and transmitted to computer system 150 and/or buyer/seller platform 155. Computer system 150 and/or buyer/seller platform 155 receives identity information for customer 180.

In some embodiments, customer 180 can use a computer system, such as a mobile device or a personal computer, to create a financial account. The computer system can access a website associated with computer system 150 and/or buyer/seller platform 155, or the computer system can run application software. Customer 180 can use the website or the application software to create a financial account. Customer 180 provides identity information to the website or to the application software, and the website or the application software causes the identity information to be transmitted to computer system 150 and/or buyer/seller platform 155. Computer system 150 and/or buyer/seller platform 155 receives identity information for customer 180.

Step 410 includes verifying the identity of the customer. Step 410 can occur in response to step 405. In some embodiments, step 410 can comprise the method of FIG. 5. Using the example of FIG. 3, in some embodiments, customer 180 has identification which meets the identification requirements. Customer 180 can have, for example, government issued identification, such as a state issued driver's license or identification card, or a federal government issued passport. Sales system 305 can obtain identity information for customer 180. For example, sales system 305 can obtain identity information, such as a driver's license number and an address, from a state issued driver's license. Sales system 305 can transmit the identity information to computer system 150 and/or buyer/seller platform 155, and computer system 150 and/or buyer/seller platform 155 can use the identity information to verify the identity of customer 180.

In some embodiments, customer 180 can use a website or application software to create a financial account. When customer 180 has identification which meets the identification requirements, the website or the application software can obtain identity information for customer 180 from the identification. The website or application can cause the identity information to be transmitted to computer system 150 and/or buyer/seller platform 155. Computer system 150 and/or buyer/seller platform 155 can use this identity information to verify the identity of customer 180.

In some embodiments, sales system 305 can arrange for an alternate method of identification. For example, sales system 305 can communicate with computer system 150 and/or buyer/seller platform 155, and computer system 150 and/or buyer/seller platform 155 can provide an alternative method of identifying customer 180.

As one example of an alternative method of identifying customer 180, computer system 150 and/or buyer/seller platform 155 can obtain personal information from personal information databases, such as from the databases of credit report agencies such as Experian, Equifax, and TransUnion. Computer system 150 and/or buyer/seller platform 155 can transmit personal questions based on the personal information to sales system 305 which customer 180 can answer to verify identity. The personal questions can include, for example, what was customer 180's residence address five years ago and can list a number of possible answers to select from. As a second example, the personal questions can include what is customer 180's current outstanding phone bill balance and can list a number of possible answers to select from. Computer system 150 and/or buyer/seller platform 155 can verify the identity of customer 180 by comparing customer 180's personal question responses, received by computer system 150 and/or buyer/seller platform 155 from sales system 305, to the personal information obtained from the personal information databases. In some embodiments, when identifying object 390 is a mobile device, computer system 150 and/or buyer/seller platform 155 can transmit the personal questions to the mobile device, and can receive the personal question responses from the mobile device.

In some embodiments, customer 180 can use a website or application software to create a financial account. The website or the application software can arrange for an alternative method of verifying the identity of customer 180, such as the alternative method discussed above. Instead of transmitting the questions to sales system 305, in some of these embodiments, computer system 150 and/or buyer/seller platform 155 can transmit the questions to customer 180 via the website or the application software. Computer system 150 and/or buyer/seller platform 155 can verify the identity of customer 180 by comparing customer 180's personal question responses, caused to be transmitted to computer system 150 and/or buyer/seller platform 155 by the website or the application software, to the personal information obtained from the personal information databases.

Step 415 includes creating a financial account. Step 415 can occur in response to step 405 or step 410 or steps 405 and 410. Using the example of FIG. 3, computer system 150 can include a storage device containing a database of financial accounts. Computer system 150 and/or buyer/seller platform 155 can create a financial account by making the appropriate changes to the database of financial accounts. A person of ordinary skill in the art will appreciated that there are many ways to create a financial account.

Step 420 includes associating the financial account with the customer. Step 420 can occur in response to step 415. Using the example of FIG. 3, computer system 150 can include a storage device containing a mapping database that associates the financial account with the customer identity information. Computer system 150 and/or buyer/seller platform 155 can use the mapping database to associate the financial account with the identity information for customer 180. A person of ordinary skill in the art will appreciate that there are many ways to associate the financial account with the identity information for customer 180.

Step 425 includes receiving identifying information for an identifying object. Step 425 can occur after step 415 or after step 420 or before any of or all of steps 405-420. Using the example of FIG. 3, in some embodiments, identifying object 390 can be a mobile device. Sales system 305 can obtain identifying information from the mobile device. Sales system 305 can transmit the identifying information to computer system 150 and/or buyer/seller platform 155. Computer system 150 and/or buyer/seller platform 155 can receive the identifying information for the mobile device.

In some embodiments, identifying object 390 can be a biometrically identifiable object, such as a finger, a hand, an iris, a retina, or a face. Sales system 305 can obtain identifying information for the biometrically identifiable object, such as by using a biometric scanner that is part of sales system 305, and can transmit this identifying information to computer system 150 and/or buyer/seller platform 155. Computer system 150 and/or buyer/seller platform 155 can receive the identifying information for the biometrically identifiable object.

In some embodiments, identifying object 390 can be an object, such as a magnetic stripe card, a smart card, a proximity card, a re-programmable magnetic stripe card, a card containing a quick response (QR) code, a card containing a bar code, or a government issued identification card. Sales system 305 can obtain identifying information from these objects, for example by using a card reader or a scanner that is part of sales system 305, and can transmit this identifying information to computer system 150 and/or buyer/seller platform 155. Computer system 150 and/or buyer/seller platform 155 can receive the identifying information for the object.

In some embodiments, identifying object 390 can be a proxy card. Sales system 305 can obtain identifying information from the proxy card, for example by using a card reader or a scanner that is part of sales system 305, and can transmit this identifying information to computer system 150 and/or buyer/seller platform 155. Computer system 150 and/or buyer/seller platform 155 can receive the identifying information for the proxy card.

Step 430 includes associating the identifying information for the identifying object with the financial account. Step 430 can occur in response to steps 425 and 415. Using the example of FIG. 3, computer system 150 can include a storage device containing a mapping database that associates the identifying information for identifying objects with financial accounts. Computer system 150 and/or buyer/seller platform 155 can execute a database operation using the mapping database to associate the identifying information for identifying object 390 with the financial account.

Step 435 includes receiving a passcode. Step 435 can occur before or after step 425 or step 430, and can occur after any of steps 405-420. Using the example of FIG. 3, customer 180 can provide a passcode. In various embodiments, the passcode can be a personal identification number (PIN), or a password, or a pass phrase. The passcode can be comprised of numbers, can be comprised of numbers and letters, can be comprised of numbers, letters, and punctuation marks, or can be comprised of any characters. The passcode can also include spaces.

In some embodiments, the passcode can be entered using sales system 305, and sales system 305 can transmit the passcode to computer system 150 and/or buyer/seller platform 155, where computer system 150 and/or buyer/seller platform 155 receives the passcode. In some embodiments, when identifying object 390 is a mobile device, the passcode can be entered using the mobile device. The mobile device can transmit the passcode to computer system 150 and/or buyer/seller platform 155, where computer system 150 and/or buyer/seller platform 155 receives the passcode. In some embodiments, the passcode can be entered via the website or the application software, and the website or the application software can cause the passcode to be transmitted to computer system 150 and/or buyer/seller platform 155, where computer system 150 and/or buyer/seller platform 155 receives the passcode.

Step 440 includes associating the passcode with the financial account. Step 440 can occur in response to step 435. Using the example of FIG. 3, computer system 150 can include a storage device containing a mapping database that associates passcodes with financial accounts. Computer system 150 and/or buyer/seller platform 155 can execute a database operation using the mapping database to associate the passcode with the financial account. A person of ordinary skill in the art will appreciate that there are many ways to associate the passcode with the financial account.

Step 445 includes receiving a photo. Step 445 can occur after steps 415 and 420, or can occur before or after any of steps 425-440. Using the example of FIG. 3, in some embodiments, sales system 305 can obtain a photo of customer 180. Sales system 305 can transmit the photo to computer system 150 and/or buyer/seller platform 155, where computer system 150 and/or buyer/seller platform 155 receives the photo. In some embodiments, when identifying object 390 is a mobile device, the mobile device can obtain a photo of customer 180. The mobile device can transmit the photo to computer system 150 and/or buyer/seller platform 155, where computer system 150 and/or buyer/seller platform 155 receives the photo. In some embodiments, the website or the application software can obtain a photo of customer 180. The website or the application software can cause the photo to be transmitted to computer system 150 and/or buyer/seller platform 155, where computer system 150 and/or buyer/seller platform 155 receives the photo.

Step 450 includes associating the photo with the financial account. Step 450 can occur in response to step 445. Using the example of FIG. 3, computer system 150 can include a storage device containing a mapping database that associates photos with financial accounts. Computer system 150 and/or buyer/seller platform 155 can execute a database operation using the mapping database to associate the photo with the financial account. A person of ordinary skill in the art will appreciate that there are many ways to associate a photo with a financial account.

Figure 5:
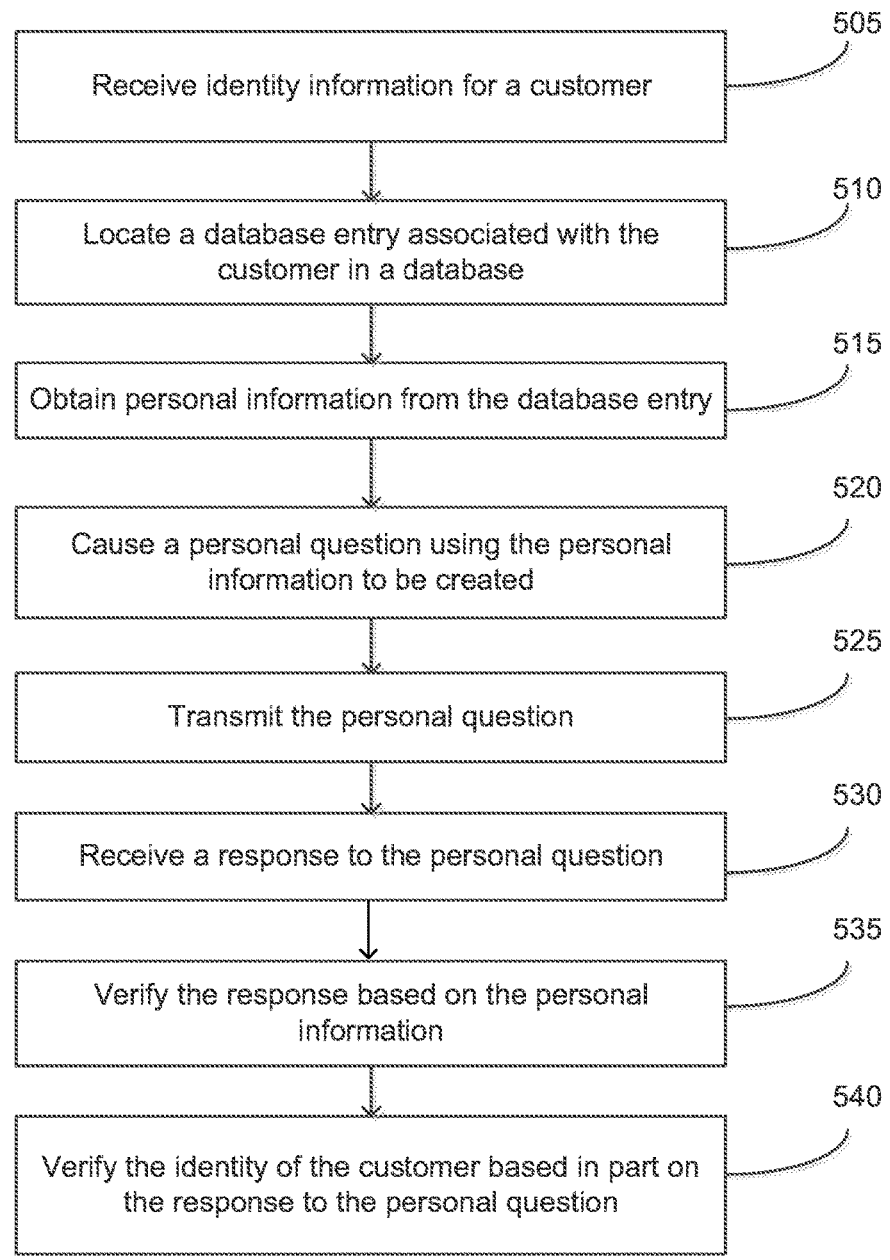
FIG. 5 is a flow chart illustrating operations of a first method for verifying the identity of a customer.

FIG. 5 is a flow chart illustrating operations of a first method for verifying the identity of a customer. In some embodiments, the method of FIG. 5 can be used to verify the identity of a customer when creating a financial account, and can represent step 410 of FIG. 4. The following description of FIG. 5 will be described using the system illustrated in FIG. 3, and will refer to labels of that figure. This is a non-limiting example and is done with the intent of making the description of FIG. 5 easier to understand. Note that, in some embodiments, including the embodiment of FIG. 3, all steps of the method of FIG. 5 can be carried out by computer system 150 and/or buyer/seller platform 155.

Step 505 includes receiving identity information for a customer. Using the example of FIG. 3, computer system 150 and/or buyer/seller platform 155 receives identity information for customer 180. The identity information can include anything that will enable computer system 150 and/or buyer/seller platform 155 locate a database entry associated with customer 180. The identity information can include, for example, the name of customer 180, the address of customer 180, the social security number of customer 180, the driver's license number of customer 180, the state identification card number of customer 180, the passport number of customer 180, or a phone number for customer 180.

Step 510 includes locating a database entry associated with the customer in a database. Step 510 can occur in response to step 505. Using the example of FIG. 3, computer system 150 and/or buyer/seller platform 155 can locate a database entry associated with customer 180 in a database. In some embodiments, computer system 150 includes a storage device containing a personal information database that associates the identity information with customer 180. Computer system 150 and/or buyer/seller platform 155 can perform a database operation to locate a database entry associated with customer 180 in the personal information database.

In some embodiments, computer system 150 and/or buyer/seller platform 155 can communicate with another computer system that includes a storage device containing a personal information database that associates the identity information with customer 180. Computer system 150 and/or buyer/seller platform 155 can locate a database entry associated with customer 180 in a database by transmitting the identity information to another computer system, and the other computer system can locate a database entry associated with customer 180 in a personal information database. For example, computer system 150 and/or buyer/seller platform 155 can communicate with a computer system of a credit reporting agency, such as Experian, Equifax, or TransUnion. Computer system 150 and/or buyer/seller platform 155 can transmit the identity information for customer 180 to a computer system of a credit reporting agency, and the computer system of the credit reporting agency can locate a database entry associated with customer 180 in a personal information database.

Step 515 includes obtaining personal information from the database entry. Step 515 can occur after step 505 or 510. Using the example of FIG. 3, computer system 150 and/or buyer/seller platform 155 can obtain personal information from the database entry. In some embodiments, computer system 150 includes a storage device containing a personal information database that associates personal information with customer 180. Computer system 150 and/or buyer/seller platform 155 can perform a database operation to obtain personal information associated with customer 180 from the personal information database.

In some embodiments, computer system 150 and/or buyer/seller platform 155 can communicate with another computer system that includes a storage device containing a personal information database that associates personal information with customer 180. Computer system 150 and/or buyer/seller platform 155 can obtain personal information associated with customer 180 from the personal information database by sending a message to request personal information related to customer 180 to the other computer system. The other computer system can perform a database operation to obtain personal information associated with customer 180 from the personal information database.

For example, computer system 150 and/or buyer/seller platform 155 can send a message requesting personal information associated with customer 180 to a computer system of a credit reporting agency, such as Experian, Equifax, or TransUnion. The computer system of the credit reporting agency can perform a database operation to obtain personal information associated with customer 180 from a personal information database. The computer system of the credit reporting agency can transmit the personal information associated with customer 180 to computer system 150 and/or buyer/seller platform 155, resulting in computer system 150 and/or buyer/seller platform 155 obtaining personal information associated with customer 180 from the personal information database of the credit reporting agency.

Step 520 includes causing a personal question using the personal information to be created. Step 520 can occur in response to step 515. Using the example of FIG. 3, computer system 150 and/or buyer/seller platform 155 can cause a personal question using the personal information to be created. In some embodiments, computer system 150 and/or buyer/seller platform 155 can create the personal question using the personal information. In some embodiments, computer system 150 and/or buyer/seller platform 155 can transmit a message to another computer system that causes the other computer system to create a personal question using the personal information. The personal question can include, for example, what was customer 180's residence address five years ago and can list a number of possible answers to select from. As a second example, the personal question can include what is customer 180's current outstanding phone bill balance and can list a number of possible answers to select from.

Step 525 includes transmitting the personal question. Step 525 can occur in response to step 520. Using the example of FIG. 3, computer system 150 and/or buyer/seller platform 155 can transmit the personal question. For example, computer system 150 and/or buyer/seller platform 155 can transmit the personal question to sales system 305, or, when identifying object 390 is a mobile device, to the mobile device.

Step 530 includes receiving a response to the personal question. Step 530 can occur in response to step 525. Using the example of FIG. 3, computer system 150 and/or buyer/seller platform 155 can receive a response to the personal question. For example, customer 180 can answer the personal question using sales system 305, or, when identifying object 390 is a mobile device and the personal question was transmitted to the mobile device, using the mobile device. Sales system 305 or the mobile device can transmit customer 180's response to the personal question to computer system 150 and/or buyer/seller platform 155, resulting in computer system 150 and/or buyer/seller platform 155 receiving a response to the personal question.

Step 535 includes verifying the response based on the personal information. Step 535 can occur in response to step 530. Using the example of FIG. 3, computer system 150 and/or buyer/seller platform 155 can verify the response based on the personal information. For example, if the personal question is "what was customer 180's residence address five years ago?", computer system 150 and/or buyer/seller platform 155 can use the personal information to determine customer 180's residence address five years ago, and can compare customer 180's response to the determined residence address.

Step 540 includes verifying the identity of the customer based at least in part on the response to the personal question. Step 540 can occur in response to step 535. Using the example of FIG. 3, computer system 150 and/or buyer/seller platform 155 can verify the identity of the customer based at least in part on the response to the personal question. For example, computer system 150 and/or buyer/seller platform 155 can determine whether customer 180 provided an answer to the personal question that matched the personal information from the personal information database. When customer 180's answer matches the personal information from the personal information database, it is more likely that customer 180 is the person associated with the identity information. When customer 180's answer does not match the personal information from the database, it is less likely that customer 180 is the person associated with the identity information. Computer system 180 can verify the identity of customer 180 based at least in part on customer 180's response to the personal question.

Figure 6:
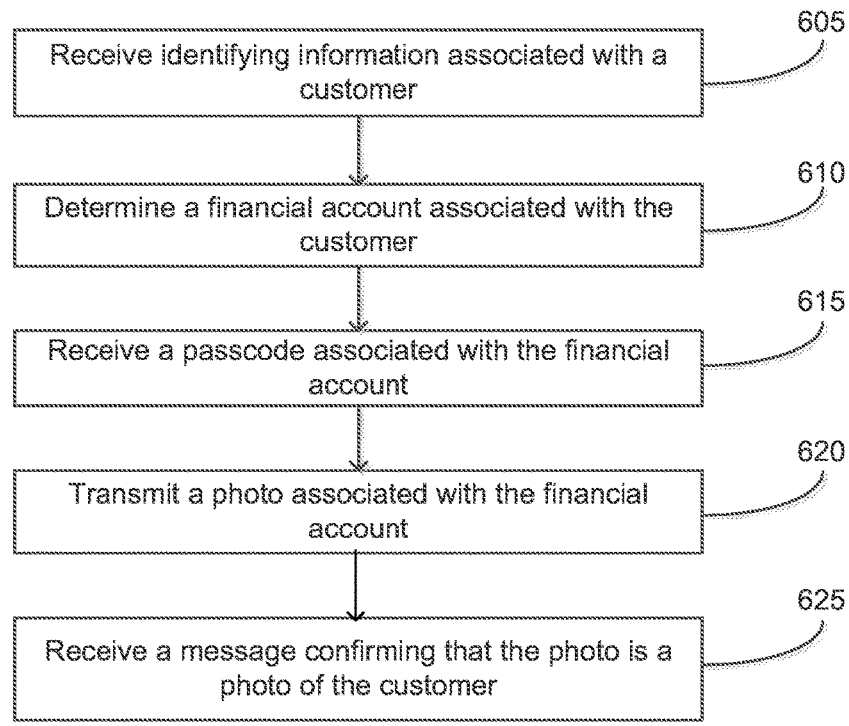
FIG. 6 is a flow chart illustrating operations of a second method for verifying the identity of a customer.

FIG. 6 is a flow chart illustrating operations of a second method for verifying the identity of a customer. In some embodiments, the method of FIG. 6 can be used to identify a customer after a financial account has been created for the customer, and a passcode and a photo of the customer has been associated with the financial account. The following description of FIG. 6 will be described using the system illustrated in FIG. 3, and will refer to labels of that figure. This is a non-limiting example and is done with the intent of making the description of FIG. 6 easier to understand. Note that, in some embodiments, including the embodiment of FIG. 3, all steps of the method of FIG. 6 can be carried out by computer system 150 and/or buyer/seller platform 155.

Step 605 includes receiving identifying information associated with a customer. Using the example of FIG. 3, computer system 150 and/or buyer/seller platform 155 can receive identifying information associated with customer 180. In some embodiments, identifying object 390 can be a mobile device, and the identifying information can obtained from the mobile device. For example, when identifying object 390 is a mobile device, sales system 305 can obtain identifying information associated with the mobile device that is associated with customer 180. Sales system 305 can transmit the identifying information to computer system 150 and/or buyer/seller platform 155, resulting in computer system 150 and/or buyer/seller platform 155 receiving identifying information associated with customer 180.

In some embodiments, identifying object 390 can be a biometrically identifiable object, such as a finger, a hand, an iris, a retina, or a face, and the identifying information can be obtained from the biometrically identifiable object. For example, sales system 305 can obtain identifying information, such as biometric information, from the biometrically identifiable object. Sales system 305 can transmit the identifying information to computer system 150 and/or buyer/seller platform 155, resulting in computer system 150 and/or buyer/seller platform 155 receiving identifying information associated with customer 180.

In various embodiments, identifying object 390 can be a magnetic stripe card, a smart card, a proximity card, a re-programmable magnetic stripe card, a card containing a quick response (QR) code, a card containing a bar code, a government issued identification card. Sales system 305 can obtain identifying information from identifying object 390, for example by reading identifying information from identifying object 390 using a card reader that is part of sales system 305, or by scanning identifying object 390 with a scanner that is part of sales system 305. Sales system 305 can transmit the identifying information to computer system 150 and/or buyer/seller platform 155, resulting in computer system 150 and/or buyer/seller platform 155 receiving identifying information associated with customer 180.

In some embodiments, identifying object 390 can be a proxy card. A proxy card is a card that can be associated with various payment mechanisms. Sales system 305 can obtain identifying information from identifying object 390, for example by reading identifying information from the proxy card using a card reader that is part of sales system 305, or by scanning the proxy card with a scanner that is part of sales system 305. Sales system 305 can transmit the identifying information to computer system 150 and/or buyer/seller platform 155, resulting in computer system 150 and/or buyer/seller platform 155 receiving identifying information associated with customer 180.

Step 610 includes determining a financial account associated with the customer. Step 610 can occur in response to step 605. Using the example of FIG. 3, computer system 150 can include a storage device containing a mapping database that associates identifying information with financial accounts. Computer system 150 and/or buyer/seller platform 155 can execute a database operation using the mapping database to determine the financial account associated with the identifying information. The financial account is associated with customer 180.

In some embodiments, when identifying object 390 is a biometrically identifiable object, computer system 150 can include a storage device containing a mapping database. The mapping database can associate identity information, for example the name of customer 180, and "reference identifying information," for example a fingerprint of customer 180 taken when the financial account was created, with the financial account. Customer 180 can provide identity information, such as a name, to merchant 135. Merchant 135 can use sales system 305 to obtain identifying information from identifying object 390. For example, sales system 305 can obtain a fingerprint from customer 180.

Sales system 305 can transmit the identity information (e.g., customer 180's name) and the identifying information (e.g., customer 180's fingerprint) to computer system 150 and/or buyer/seller platform 155. Computer system 150 and/or buyer/seller platform 155 can execute a database operation using the mapping database to obtain the reference identifying information, for example the reference fingerprint of customer 180, associated with the financial account. In some embodiments, when the received identifying information (e.g., customer 180's fingerprint) and the reference identifying information (e.g., the reference fingerprint from the mapping database) are a match, the identity of customer 180 is verified.

Step 615 includes receiving a passcode associated with the financial account. Step 615 can occur before or after step 605 or step 610. Using the example of FIG. 3, computer system 150 and/or buyer/seller platform 155 can receive a passcode associated with the financial account. In some embodiments, computer system 150 can include a storage device containing a mapping database that associates the financial account with a passcode. In some embodiments, customer 180 can enter a passcode using sales system 305, and sales system 305 can transmit the passcode to computer system 150 and/or buyer/seller platform 155, resulting in computer system 150 and/or buyer/seller platform 155 receiving a passcode associated with the financial account. In some embodiments, when identifying object 390 is a mobile device, customer 180 can enter a passcode using the mobile device. The mobile device can transmit the passcode to computer system 150 and/or buyer/seller platform 155, resulting in computer system 150 and/or buyer/seller platform 155 receiving a passcode associated with the financial account. In some embodiments, when the received passcode and the passcode obtained from the mapping database match, the identity of customer 180 is verified.

Step 620 includes transmitting a photo associated with the financial account. Step 620 can occur in response to step 605 or step 610 or before or after step 615. Using the example of FIG. 3, computer system 150 and/or buyer/seller platform 155 can transmit a photo associated with the financial account. In some embodiments, computer system 150 can include a storage device containing a mapping database that associates the financial account with a photo. Computer system 150 and/or buyer/seller platform 155 can perform a database operation to obtain the photo associated with the financial account. Computer system 150 and/or buyer/seller platform 155 can transmit the photo, which is associated with the financial account, to sales system 305.

Step 625 includes receiving a message confirming that the photo is a photo of the customer. Step 625 can occur in response to step 620. Using the example of FIG. 3, merchant 135 can compare the photo to customer 180. Sales system 305 can transmit a photo verification confirmation message to computer system 150 and/or buyer/seller platform 155 when merchant 135 confirms that the photo is a photo of customer 180.

In some embodiments, when computer system 150 and/or buyer/seller platform 155 receives the photo verification confirmation message, the identity of customer 180 is verified. In some embodiments, both verification of customer 180 using the passcode and verification of customer 180 using the photo are required to complete the verification of the identity of customer 180.

Figure 7:
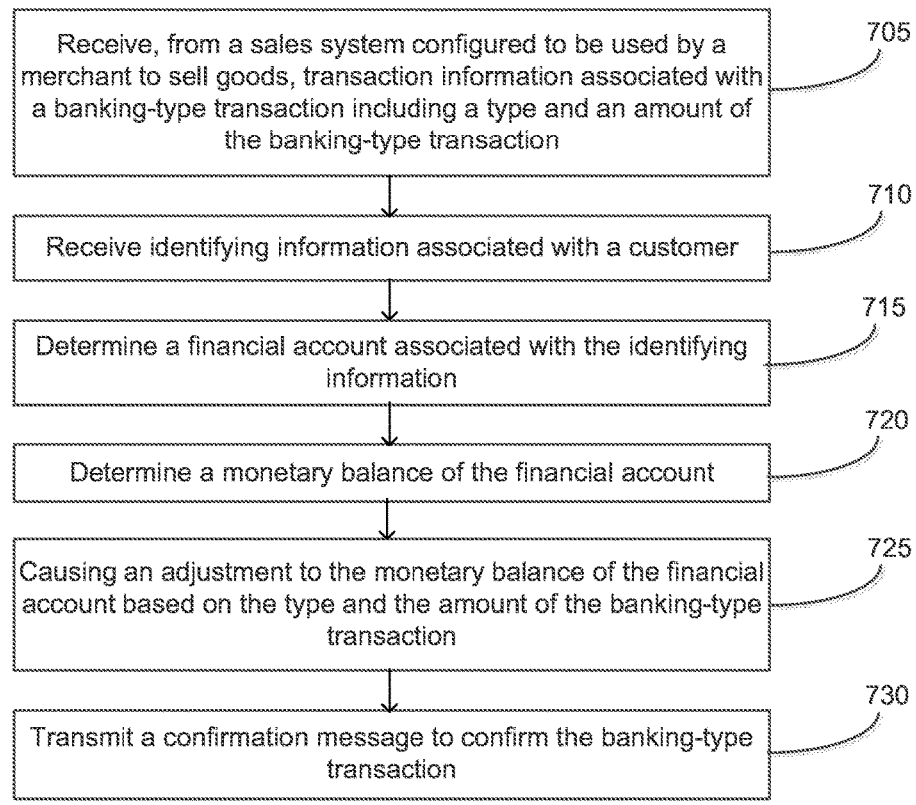
FIG. 7 is a flow chart illustrating operations for a customer to make a banking-type transaction.

FIG. 7 is a flow chart illustrating operations for a customer to make a banking-type transaction. The following description of FIG. 7 will be described using the system illustrated in FIG. 3, and will refer to labels of that figure. This is a non-limiting example and is done with the intent of making the description of FIG. 7 easier to understand. Note that, in some embodiments, including the embodiment of FIG. 3, all steps of the method of FIG. 7 can be carried out by computer system 150 and/or buyer/seller platform 155.

Customer 180 can create a financial account using, for example, the method of FIG. 4, which can also associate a passcode and a photo with the financial account. After creating the financial account, customer 180 can make a banking-type transaction with merchant 135. Examples of banking-type transactions include deposits, withdrawals, loans, cash advances, transfers, opening accounts, and closing accounts, among others. In some embodiments, computer 150 is controlled by or associated with a financial entity. The financial entity, in contrast to a bank or a credit union, may be prevented from holding funds (i.e., money) for customers such as customer 180.

In some embodiments, computer 150 is controlled by or associated with a financial entity. The financial entity, in contrast to a bank or a credit union, may be prevented from holding funds (i.e., money) for customers such as customer 180. In some embodiments, a monetary balance of a customer financial account of the financial entity can be held by a fund holding entity, such as a bank or a credit union, rather than by the financial entity. In some embodiments, the financial entity has a fund holding account, which can hold monetary balances of multiple customer financial accounts, with the fund holding entity. The financial entity can maintain an accounting of the monetary balance of each customer financial account of the multiple customer financial accounts, while the funds for the multiple customer financial account can be held by the fund holding company in the fund holding account. For example, the financial entity can have a bank account with a bank, the bank account can hold the monetary balances of all of the customer financial accounts of the financial entity, and the financial entity can maintain an accounting of the monetary balance of each customer financial account.

Step 705 includes receiving, from a sales system configured to be used by a merchant to sell goods, transaction information associated with a banking-type transaction including a type and an amount of the banking-type transaction. Using the example of FIG. 3, merchant 135 sells goods, and uses sales system 305 to sell the goods. Sales system 305 is configured to be used by merchant 135 to sell the goods. In some embodiments, the configuration of sales system 305 is by including a card reader and a scanner to enable merchant 135 to use the card reader and the scanner to sell goods. In some embodiments, the configuration of sales system 305 is by including memory containing instructions that, when executed, enable sales system 305 to perform as a point of sale system for selling goods.

Customer 135 can make a banking-type transaction, such as a deposit or a withdrawal, with merchant 135. To make a deposit, customer 180 can provide deposit money 185 to merchant 135. In some embodiments, the identity of customer 180 can be verified as part of making the deposit. For example, the identity of customer 180 can be verified using an embodiment of the method of FIG. 6. In some embodiments, no identification of customer 180 is required to make a deposit. Identifying information, for example as discussed in the method of FIG. 6, can be obtained from identifying object 390 by sales system 305. Sales system 305 can transmit the identifying information, along with the transaction information, to computer system 150 and/or buyer/seller platform 155. The transaction information can include the type of the banking-type transaction (i.e., a deposit), and the amount of the deposit. The transmission results in computer system 150 and/or buyer/seller platform 155 receiving, from sales system 305, transaction information associated with the banking-type transaction.

To make a withdrawal, customer 180 can make a withdrawal request for a specific amount of money (i.e., the amount of customer 180's withdrawal request) to merchant 135. In some embodiments, the identity of customer 180 can be verified as part of making the withdrawal. For example, the identity of customer 180 can be verified using an embodiment of the method of FIG. 6. In some embodiments, customer 180 can be known to merchant 135, and no further identity verification of customer 180 is needed. Identifying information, for example as discussed in the method of FIG. 6, can be obtained from identifying object 390 by sales system 305. Sales system 305 can transmit the identifying information, along with the transaction information to computer system 150 and/or buyer/seller platform 155. The transaction information can include the type of the banking-type transaction (i.e., a withdrawal), and the amount of the withdrawal. The transmission results in computer system 150 and/or buyer/seller platform 155 receiving, from sales system 305, transaction information associated with the banking-type transaction.

Step 710 includes receiving identifying information associated with the customer. Step 710 can occur before or after step 705. Using the example of FIG. 3, identifying information, for example as discussed in the method of FIG. 6, can be obtained from identifying object 390 by sales system 305. Sales system 305 can transmit the identifying information to computer system 150 and/or buyer/seller platform 155, resulting in computer system 150 and/or buyer/seller platform 155 receiving the identifying information, which is associated with customer 180.

Step 715 includes determining a financial account associated with the identifying information. Step 715 can occur in response to step 710. Using the example of FIG. 3, computer system 150 can include a storage device containing a mapping database associating identifying information with financial accounts. Computer system 150 and/or buyer/seller platform 155 can determine the financial account associated with the identifying information by performing a database operation to determine the financial account associated with the identifying information.

Step 720 includes determining a monetary balance of the financial account. Step 720 can occur after step 715 or in response to step 705. Using the example of FIG. 3, computer system 150 can include a storage device containing a mapping database associating monetary balances with financial accounts. Computer system 150 and/or buyer/seller platform 155 can determine the monetary balance of the financial account by performing a database operation using the mapping database.

Step 725 includes causing an adjustment to the monetary balance of the financial account based on the type and the amount of the banking-type transaction. Step 725 can occur in response to step 705 or after any of steps 710-720. Using the example of FIG. 3, computer system 150 and/or buyer/seller platform 155 can cause the adjustment of the monetary balance of the financial account. When the banking-type transaction is a deposit transaction, computer system 150 and/or buyer/seller platform 155 can cause the adjustment by, for example, adjusting the monetary balance of the financial account by increasing the monetary balance based on the deposit amount.

For example, computer system 150 and/or buyer/seller platform 155 can increase the monetary balance of the financial account by the amount of the deposit, or by the amount of the deposit less a transaction fee (i.e., by an amount less than the deposit amount), or by some other amount based on the amount of the deposit. As a second example, computer system 150 and/or buyer/seller platform 155 can cause the adjustment by sending a message to a second computer system that causes the second computer system to adjust the monetary balance.

In addition to adjusting the financial account associated with customer 180, computer system 150 and/or buyer/seller platform 155 can cause an adjustment to a different financial account, the different financial account associated with merchant 135 (i.e., merchant 135's financial account). When the banking-type transaction is a deposit transaction, computer system 150 and/or buyer/seller platform 155 can adjust the monetary balance of merchant 135's financial account by decreasing the monetary balance based on the deposit amount. For example, computer system 150 and/or buyer/seller platform 155 can decrease the monetary balance of merchant 135's financial account by the amount of the deposit, or by the amount of the deposit less a transaction fee (i.e., by an amount smaller than the deposit amount), or by some other amount based on the amount of the deposit.

When the banking-type transaction is a withdrawal transaction, computer system 150 and/or buyer/seller platform 155 can cause the adjustment of the monetary balance of the financial account by decreasing the monetary balance based on the withdrawal amount. For example, computer system 150 and/or buyer/seller platform 155 can decrease the monetary balance of the financial account by the amount of the withdrawal, or by the amount of the withdrawal plus a transaction fee (i.e., by an amount larger than the withdrawal amount), or by some other amount based on the amount of the withdrawal.

In addition to causing the adjustment of the financial account associated with customer 180, computer system 150 and/or buyer/seller platform 155 can cause the adjustment of merchant 135's financial account. When the banking-type transaction is a withdrawal transaction, computer system 150 and/or buyer/seller platform 155 can adjust the monetary balance of merchant 135's financial account by increasing the monetary balance based on the deposit amount. For example, computer system 150 and/or buyer/seller platform 155 can increase the monetary balance of merchant 135's financial account by the amount of the deposit, or by the amount of the deposit plus a transaction fee (i.e., by an amount larger than the deposit amount), or by some other amount based on the amount of the deposit.

Step 730 includes transmitting a confirmation message to confirm the banking-type transaction. Step 730 can occur in response to step 725. Using the example of FIG. 3, computer system 150 and/or buyer/seller platform 155 can transmit a confirmation message to confirm the banking-type transaction.

Figure 8:
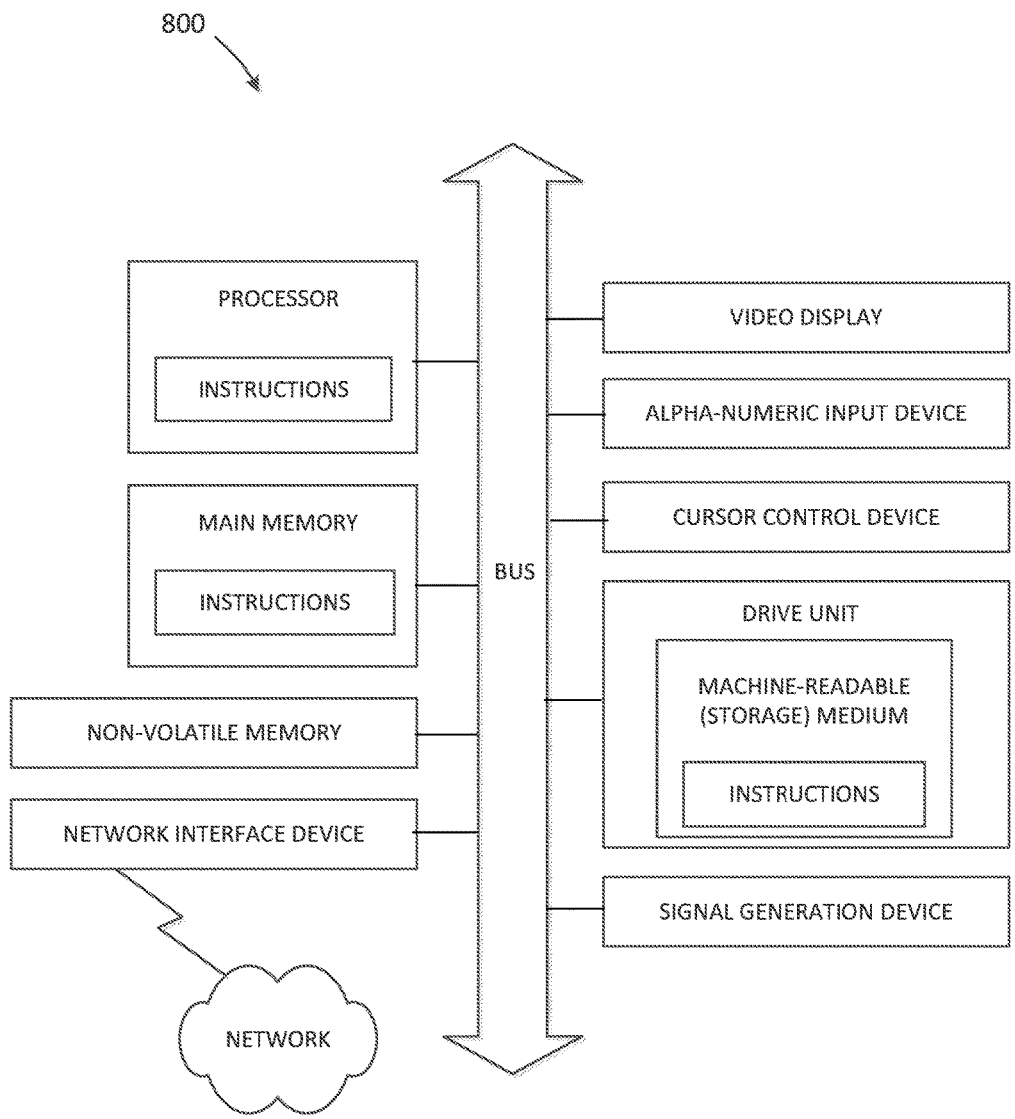
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system within which a set of instructions, for causing the machine to perform any one or more of the methodologies or modules discussed herein, may be executed. In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIGS. 1-7 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) or static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 800. The interface can include an analog modem, ISDN modem, cable modem, token ring interface, satellite transmission interface (e.g., "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 8 reside in the interface.

The computer system can have one Bus or multiple Buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. Referring to these signals as bits, values, elements, symbols, characters, terms, numbers, or the like has proven convenient at times, principally for reasons of common usage.

One should bear in mind, however, that all of these and similar terms are to be associated with the appropriate physical quantities and are merely convenient labels applied to these quantities. Unless specifically stated otherwise as apparent from the following discussion, one should appreciate that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or constructing more specialized apparatus to perform the methods of some embodiments may prove more convenient. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a laptop computer, a tablet, a set-top box (STB), a personal digital assistant (PDA), a cellular telephone, an iPhone, a Blackberry, a smart phone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), Blu-ray disks, among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A person having ordinary skill in the art will appreciate that there are various other ways to implement the described functionality. The scope of this disclosure also includes embodiments implementing the described functionality in these various other ways. Accordingly, the scope of the present disclosure is intended to embrace all such alternatives, modifications, and variations as fall within the scope of the claims, together with all equivalents thereof.

Numerous specific details are set forth in order to provide a thorough understanding of embodiments of the present invention. One skilled in the art will appreciate that embodiments of the present invention may be practiced without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

What is claimed is:

1. A method comprising:
    receiving, by a remote transactions server implemented on a computer system, from each of a plurality of point-of-sale (POS) systems, information identifying a respective merchant financial account of a plurality of merchants engaged in financial transactions with a plurality of customers, the financial transactions including electronic payments made by a subset of the plurality of customers by use of the POS systems, the electronic payments being associated with sales of goods or services to the plurality of customers, wherein the remote transactions server processes the electronic payments by obtaining funds from accounts associated with the plurality of customers and depositing a portion of the funds in one or more respective merchant financial accounts;
    in response to the electronic payments, the remote transactions server automatically obtaining funds from accounts associated with the subset of the plurality of customers, and depositing a portion of the funds in respective merchant financial accounts of the merchants;
    receiving, by the remote transactions server, from a POS system of a first merchant, code data electronically obtained from a mobile device associated with a customer that enables the remote transactions server to establish an identity of the customer in association with a banking-type transaction of the customer transacted by use of the POS system;
    establishing the identity of the customer, by the remote transactions server, based on the code data electronically obtained from the mobile device and without any other physical form of identification for the customer being provided to the first merchant in association with the banking-type transaction;
    creating, by the remote transactions server, a customer financial account at the remote transactions server based on the established identity of the customer, wherein the creation of the customer financial account includes writing data to a mapping database that automatically and remotely links the code data electronically obtained from the mobile device with the customer financial account, wherein the creating is performed, at a storage device accessible by the computer system;
    receiving, by the remote transactions server, from the POS system, transaction information associated with the banking-type transaction, the transaction information including a type and an amount of the banking-type transaction, the banking-type transaction made at the first merchant;
    in response to receiving the transaction information, automatically accessing, by the remote transactions server, the mapping database to obtain account information for the customer financial account;
    adjusting, by the remote transactions server, a monetary balance of the customer financial account at the remote transactions server based on the type and the amount of the banking-type transaction;
    determining, by the remote transactions server, a merchant financial account associated with the first merchant; and
    adjusting, by the remote transactions server, the portion of the funds that are deposited in the merchant financial account based on the type and the amount of the banking-type transaction.

2. The method of claim 1, wherein the type of the banking-type transaction is a deposit, wherein the adjusting the portion of the funds includes decreasing the portion of the funds by an amount corresponding to the amount of the deposit, and wherein the adjusting the monetary balance of the customer financial account includes increasing the monetary balance by an amount corresponding to the amount of the deposit.

3. The method of claim 1, wherein the customer is a second merchant of the plurality of merchants, wherein the customer financial account is a selected merchant financial account of the second merchant, and wherein the adjusting the portion of the funds that are deposited in the selected merchant financial account is based on the type and the amount of the banking-type transaction.

4. The method of claim 3,
    wherein the banking-type transaction is a deposit,
    wherein the adjusting the portion of the funds that are deposited in the merchant financial account includes decreasing the portion of the funds that are deposited in the merchant financial account by an amount corresponding to the amount of the deposit, and
    wherein the adjusting the portion of the funds that are deposited in the selected merchant financial account includes increasing the portion of the funds that are deposited in the selected merchant financial account by an amount corresponding to the amount of the deposit.

5. The method of claim 1, wherein the computer system is controlled by an entity other than a bank or a credit union.

6. The method of claim 1, wherein funds of the merchant financial account and funds of the customer financial account are held in a fund holding account of a fund holding entity that is one of a bank or a credit union, wherein the fund holding account is holding funds of a plurality of financial accounts, and wherein each of the plurality of financial accounts is associated with one of a customer of the plurality of customers or a merchant of the plurality of merchants.

7. The method of claim 1, further comprising: receiving an identification code; and verifying that the identification code is valid for the customer financial account.

8. The method of claim 1, wherein the mobile device is any one of a smart phone, a tablet, a portable media device, a wearable device, or a portable computer.

9. The method of claim 1, wherein the POS system is a sales system configured to be used by the first merchant to sell goods or services.

10. The method of claim 1, further comprising:

as part of an identity verification process, sending, by the remote transactions server and to the POS system, a photo of a person associated with the code data electronically obtained from the mobile device.

11. The method of claim 1, further comprising:

receiving, by the remote transactions server, from a second POS system of a second merchant, second transaction information associated with a second banking-type transaction including a type and an amount of the second banking-type transaction, the second banking-type transaction made by the customer by use of the second POS system;

in response to receiving the second transaction information, automatically determining, by the remote transactions server, the customer financial account associated with the customer;

adjusting, by the remote transactions server, the monetary balance of the customer financial account based on the type and the amount of the second banking-type transaction;

determining, by the remote transactions server, a second merchant financial account associated with the second merchant; and adjusting, by the remote transactions server, the portion of the funds that are deposited in the second merchant financial account based on the type and the amount of the second banking-type transaction.

12. The method of claim 1, wherein the physical form of identification is any of a magnetic stripe card, a smart card, a proximity card, a re-programmable magnetic stripe card, a card containing a quick response (QR) code, a card containing a bar code, a government issued identification card, or a proxy card.

13. One or more computer-readable non-transitory storage media embodying software that is operable when executed to, at a remote transactions server:

receive, from each of a plurality of point-of-sale (POS) systems, information identifying a respective merchant financial account of a plurality of merchants engaged in financial transactions with a plurality of customers, the financial transactions including electronic payments made by a subset of the plurality of customers by use of the POS systems, the electronic payments being associated with sales of goods or services to the plurality of customers, wherein the remote transactions server processes the electronic payments by obtaining funds from accounts associated with the plurality of customers and depositing a portion of the funds in one or more respective merchant financial accounts;

in response to the electronic payments, automatically obtain funds from accounts associated with the subset of the plurality of customers, and depositing a portion of the funds in respective merchant financial accounts of the merchants;

receive, from a POS system of a first merchant, code data electronically obtained from a mobile device associated with a customer that enables the remote transactions server to establish an identity of the customer in association with a banking-type transaction of the customer transacted by use of the POS system;

establish the identity of the customer based on the code data electronically obtained from the mobile device and without any other physical form of identification for the customer being provided to the first merchant in association with the banking-type transaction;

create a customer financial account at the remote transactions server based on the established identity of the customer, wherein the creation of the customer financial account includes writing data to a mapping database that automatically and remotely links the code data electronically obtained from the mobile device with the customer financial account, wherein the creating is performed, at a storage device accessible by the computer system;

receive transaction information associated with the banking-type transaction, the transaction information including a type and an amount of the banking-type transaction, the banking-type transaction made at the first merchant;

in response to receiving the transaction information, automatically access the mapping database to obtain account information for the customer financial account;

adjust a monetary balance of the customer financial account at the remote transactions server based on the type and the amount of the banking-type transaction;

determine a merchant financial account associated with the first merchant; and adjust the portion of the funds that are deposited in the merchant financial account based on the type and the amount of the banking-type transaction.

14. The media of claim 13, wherein the type of the banking-type transaction is a deposit, wherein the adjusting the portion of the funds includes decreasing the portion of the funds by an amount corresponding to the amount of the deposit, and wherein the adjusting the monetary balance of the customer financial account includes increasing the monetary balance by an amount corresponding to the amount of the deposit.

15. The media of claim 13, wherein the customer is a second merchant of the plurality of merchants, wherein the customer financial account is a selected merchant financial account of the second merchant, and wherein the adjusting the portion of the funds that are deposited in the selected merchant financial account is based on the type and the amount of the banking-type transaction.

16. The media of claim 15, wherein the banking-type transaction is a deposit, wherein the adjusting the portion of the funds that are deposited in the merchant financial account includes decreasing the portion of the funds that are deposited in the merchant financial account by an amount corresponding to the amount of the deposit, and wherein the adjusting the portion of the funds that are deposited in the selected merchant financial account includes increasing the portion of the funds that are deposited in the selected merchant financial account by an amount corresponding to the amount of the deposit.

17. The media of claim 13, wherein the computer system is controlled by an entity other than a bank or a credit union.

18. The media of claim 13, wherein funds of the merchant financial account and funds of the customer financial account are held in a fund holding account of a fund holding entity that is one of a bank or a credit union,
wherein the fund holding account is holding funds of a plurality of financial accounts, and
wherein each of the plurality of financial accounts is associated with one of a customer of the plurality of customers or a merchant of the plurality of merchants.

19. The media of claim 13, wherein the software is further operable when executed to:
receive an identification code; and
verify that the identification code is valid for the customer financial account.

20. The media of claim 13, wherein the mobile device is any one of a smart phone, a tablet, a portable media device, a wearable device, or a portable computer.

21. The media of claim 13, wherein the POS system is a sales system configured to be used by the first merchant to sell goods or services.

22. The media of claim 13, wherein the software is further operable when executed to:
as part of an identity verification process, send to the POS server a photo of a person associated with the code data electronically obtained from the mobile device.

23. The media of claim 13, wherein the software is further operable when executed to:
receive from a second POS system of a second merchant, second transaction information associated with a second banking-type transaction including a type and an amount of the second banking-type transaction, the second banking-type transaction made by the customer by use of the second POS system;
in response to receiving the second transaction information, automatically determine the customer financial account associated with the customer;
adjust the monetary balance of the customer financial account based on the type and the amount of the second banking-type transaction;
determine a second merchant financial account associated with the second merchant; and
adjust the portion of the funds that are deposited in the second merchant financial account based on the type and the amount of the second banking-type transaction.

24. The media of claim 13, wherein the physical form of identification is any of a magnetic stripe card, a smart card, a proximity card, a re-programmable magnetic stripe card, a card containing a quick response (QR) code, a card containing a bar code, a government issued identification card, or a proxy card.

25. A system comprising:
one or more processors; and
one or more computer-readable non-transitory storage media coupled to one or more of the processors and comprising instructions operable when executed by one or more of the processors to cause the system to:
receive, from each of a plurality of point-of-sale (POS) systems, information identifying a respective merchant financial account of a plurality of merchants engaged in financial transactions with a plurality of customers, the financial transactions including electronic payments made by a subset of the plurality of customers by use of the POS systems, the electronic payments being associated with sales of goods or services to the plurality of customers, wherein the remote transactions server processes the electronic payments by obtaining funds from accounts associated with the plurality of customers and depositing a portion of the funds in one or more respective merchant financial accounts;
in response to the electronic payments, automatically obtain funds from accounts associated with the subset of the plurality of customers, and depositing a portion of the funds in respective merchant financial accounts of the merchants;
receive, from a POS system of a first merchant, code data electronically obtained from a mobile device associated with a customer that enables the remote transactions server to establish an identity of the customer in association with a banking-type transaction of the customer transacted by use of the POS system;
establish the identity of the customer based on the code data electronically obtained from the mobile device and without any other physical form of identification for the customer being provided to the first merchant in association with the banking-type transaction;
create a customer financial account at the remote transactions server based on the established identity of the customer, wherein the creation of the customer financial account includes writing data to a mapping database that automatically and remotely links the code data electronically obtained from the mobile device with the customer financial account, wherein the creating is performed, at a storage device accessible by the computer system;
receive transaction information associated with the banking-type transaction, the transaction information including a type and an amount of the banking-type transaction, the banking-type transaction made at the first merchant;
in response to receiving the transaction information, automatically access the mapping database to obtain account information for the customer financial account;
adjust a monetary balance of the customer financial account at the remote transactions server based on the type and the amount of the banking-type transaction;
determine a merchant financial account associated with the first merchant; and
adjust the portion of the funds that are deposited in the merchant financial account based on the type and the amount of the banking-type transaction.

26. The system of claim 25, wherein the type of the banking-type transaction is a deposit, wherein the adjusting the portion of the funds includes decreasing the portion of the funds by an amount corresponding to the amount of the deposit, and wherein the adjusting the monetary balance of the customer financial account includes increasing the monetary balance by an amount corresponding to the amount of the deposit.

27. The system of claim 25, wherein the customer is a second merchant of the plurality of merchants, wherein the customer financial account is a selected merchant financial account of the second merchant, and wherein the adjusting the portion of the funds that are deposited in the selected merchant financial account is based on the type and the amount of the banking-type transaction.

28. The system of claim 27,
wherein the banking-type transaction is a deposit, wherein the adjusting the portion of the funds that are deposited in the merchant financial account includes decreasing the portion of the funds that are deposited in the merchant financial account by an amount corresponding to the amount of the deposit, and wherein the adjusting the portion of the funds that are deposited in the selected merchant financial account includes increasing the portion of the funds that are deposited in the selected merchant financial account by an amount corresponding to the amount of the deposit.

29. The system of claim 25, wherein the computer system is controlled by an entity other than a bank or a credit union.

30. The system of claim 25, wherein funds of the merchant financial account and funds of the customer financial account are held in a fund holding account of a fund holding entity that is one of a bank or a credit union, wherein the fund holding account is holding funds of a plurality of financial accounts, and wherein each of the plurality of financial accounts is associated with one of a customer of the plurality of customers or a merchant of the plurality of merchants.

31. The system of claim 25, wherein the software is further operable when executed to:

receive an identification code; and verify that the identification code is valid for the customer financial account.

32. The system of claim 25, wherein the mobile device is any one of a smart phone, a tablet, a portable media device, a wearable device, or a portable computer.

33. The system of claim 25, wherein the POS system is a sales system configured to be used by the first merchant to sell goods or services.

34. The system of claim 25, wherein the software is further operable when executed to:

as part of an identity verification process, send to the POS server a photo of a person associated with the code data electronically obtained from the mobile device.

35. The system of claim 25, wherein the software is further operable when executed to:

receive from a second POS system of a second merchant, second transaction information associated with a second banking-type transaction including a type and an amount of the second banking-type transaction, the second banking-type transaction made by the customer by use of the second POS system;

in response to receiving the second transaction information, automatically determine the customer financial account associated with the customer;

adjust the monetary balance of the customer financial account based on the type and the amount of the second banking-type transaction;

determine a second merchant financial account associated with the second merchant; and adjust the portion of the funds that are deposited in the second merchant financial account based on the type and the amount of the second banking-type transaction.

36. The system of claim 25, wherein the physical form of identification is any of a magnetic stripe card, a smart card, a proximity card, a re-programmable magnetic stripe card, a card containing a quick response (QR) code, a card containing a bar code, a government issued identification card, or a proxy card.

* * * * *